(12) United States Patent
Budweil

(10) Patent No.: US 8,746,388 B2
(45) Date of Patent: Jun. 10, 2014

(54) VEHICLE HAVING VARIABLE TRACK

(75) Inventor: Rafal Budweil, Krakow (PL)

(73) Assignee: Jaxa Networks, Krakow (PL)

( * ) Notice: Subject to any disclaimer, the term of this patent is extended or adjusted under 35 U.S.C. 154(b) by 0 days.

(21) Appl. No.: 13/698,669

(22) PCT Filed: May 16, 2011

(86) PCT No.: PCT/EP2011/057895
§ 371 (c)(1),
(2), (4) Date: Nov. 19, 2012

(87) PCT Pub. No.: WO2011/144574
PCT Pub. Date: Nov. 24, 2011

(65) Prior Publication Data
US 2013/0062133 A1 Mar. 14, 2013

(30) Foreign Application Priority Data

May 17, 2010 (EP) .................................. 10461516
Dec. 31, 2010 (EP) .................................. 10460056

(51) Int. Cl.
*B62D 61/12* (2006.01)
(52) U.S. Cl.
USPC ........................................................ 180/209

(58) Field of Classification Search
USPC ................................... 180/209, 210, 211, 215
See application file for complete search history.

(56) References Cited

U.S. PATENT DOCUMENTS 3,820,497 A * 6/1974 Konijn ........................ 440/12.5
4,395,191 A * 7/1983 Kaiser ........................... 414/694
5,137,101 A * 8/1992 Schaeff ......................... 180/8.1
7,780,197 B2 * 8/2010 White ........................... 280/781
7,832,741 B2 * 11/2010 Donaldson ................. 280/6.156

FOREIGN PATENT DOCUMENTS

FR 2844245 A1 * 3/2004

* cited by examiner

*Primary Examiner* — Faye M. Fleming
(74) *Attorney, Agent, or Firm* — Mark M. Friedman

(57) ABSTRACT

A vehicle comprising a front axle with a pair of front wheels (111, 112) having a track width adjustable between a wide track and a narrow track, a drive rear axle with a rear wheel (121), steering means configured to control the turn of the rear wheel (121) when the front wheels (111, 112) are set to the narrow track and track width control means configured to change the track width of the front wheels (111, 112) and to change the wheel base between the front axle and the rear axle such that for the wide track of the front wheels (111, 112) the wheel base is longer than for the narrow track of the front wheels (111, 112).

27 Claims, 23 Drawing Sheets

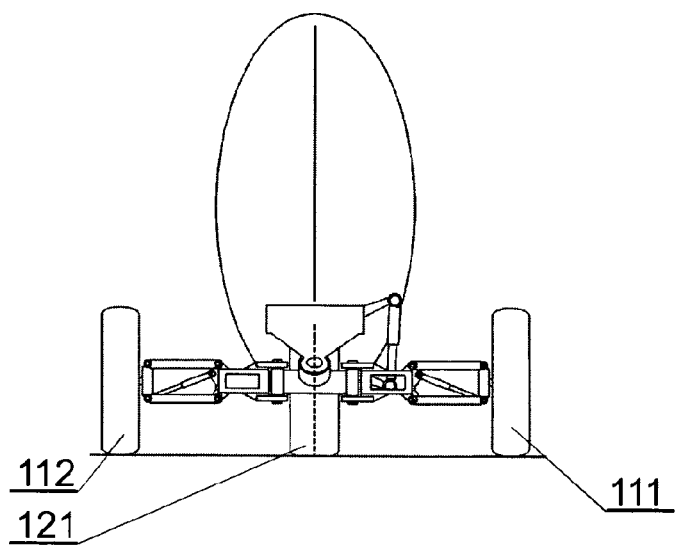
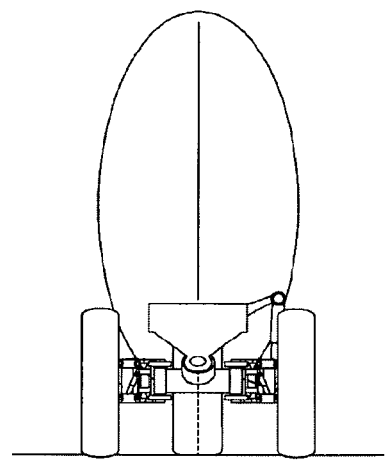
Fig. 2A  Fig. 2B
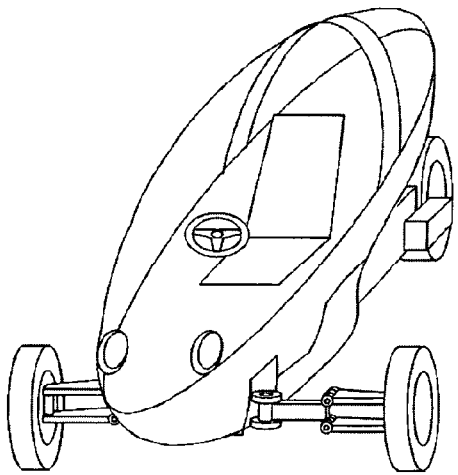
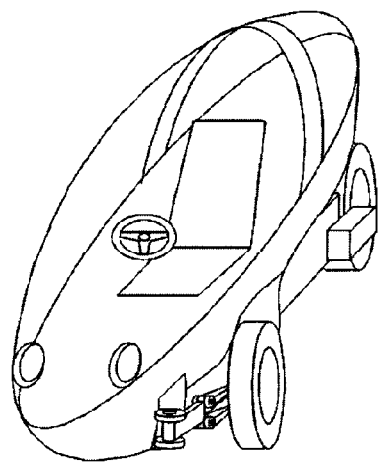
Fig. 3A  Fig. 3B

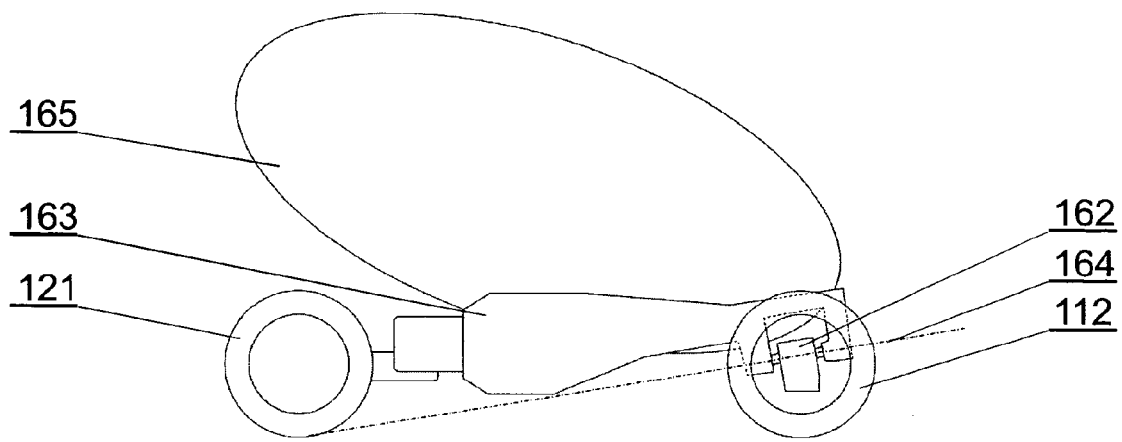
Fig. 19
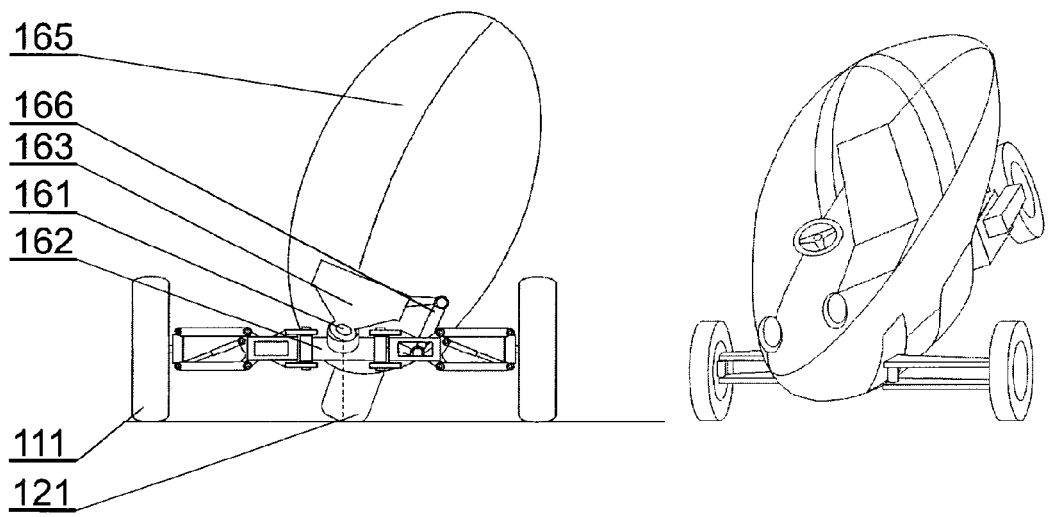
Fig. 20
Fig. 21

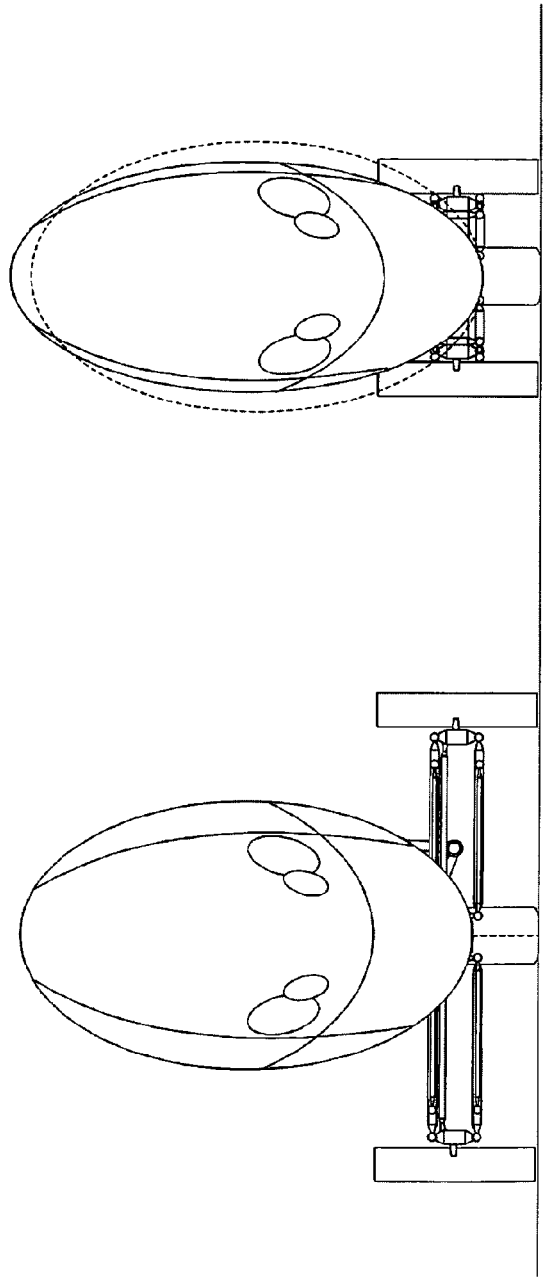
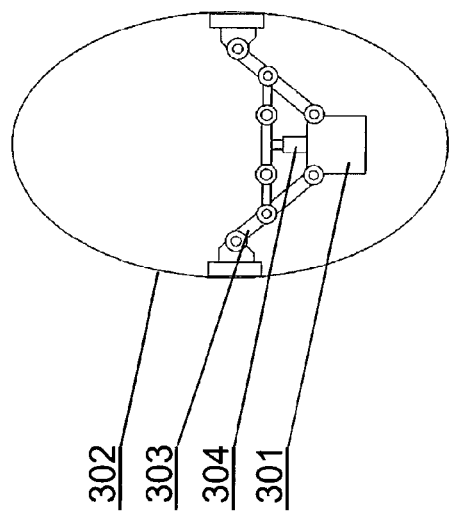
Fig. 23A
Fig. 23B

VEHICLE HAVING VARIABLE TRACK

TECHNICAL FIELD

The present invention relates to vehicles with a variable track.

BACKGROUND ART

There are continuous attempts made to enhance the maneuverability and stability of vehicles.

For example, variable track axles are known to facilitate the use of vehicles in different environments, adjustment of vehicle aerodynamics at different speeds or adjustment of vehicle stability at different driving conditions. There are also known three-wheeled vehicles with a tiltable frame for increasing the driving capabilities of the vehicle at higher speeds.

For example, a U.S. Pat. No. 6,902,022 presents a tractor having a convertible front end and a variable track width. The tractor has a steerable, interchangeable front wheel assembly and an adjustable rear track width. The removable front wheels assembly allows easy conversion between a single wheel and a two wheel front wheel assembly. In combination with the interchangeable front wheel assembly, the adjustable rear wheel track width allows changing of the turning radius of the tractor. The configuration is clearly directed to large and heavy vehicles of wide turning radius, the turning radius being adjustable by the width of the rear track.

In turn, a PCT application No. WO9950128 presents a short, narrow motor vehicle having a parallelogram linkage at each side, to which the front or rear wheels are connected, enabling displacement of wheels in a coordinated way. The vehicle is steered via front wheels and the steering mechanism is configured to enable the front wheels to be steered irrespective of the extent of their displacement, although in the retracted position the range of turn is limited. The rear wheels are non-steerable.

A U.S. Pat. No. 4,717,164 presents a road vehicle comprising a rotatable chassis section rotatable with respect to a fixed chassis section, a steering mechanism and a banking mechanism for automatically rotating the rotatable chassis section about the horizontal axis whenever the steering mechanism is actuated to steer the vehicle. Such vehicle may become unstable at low speed and taking a sharp turn.

A U.S. Pat. No. 5,927,424 presents a self-balancing vehicle with at least three wheels: one steerable and two non-steerable, wherein at least one section of the vehicle is tiltable about the longitudinal axis of the vehicle via a power-assisted tilt element. The tilt is produced as a function of a sensor measurement of the magnitude and/or the direction of a change in direction of the steerable wheel during travel. The vehicle has limited steering capabilities due to only one steerable wheel.

A US patent application No. US20060170171 presents a vehicle with a tiltable chassis and front wheels adapted to move transverse to their axes of rotation in order to tilt said chassis. The front wheels have variable track width, configured to be set to wide track for low speeds and to narrow track for high speeds, so as to allow tilting at high speeds. The vehicle is tiltable by tilting the whole chassis together with all wheels.

The disadvantage of the above-mentioned vehicles is that they occupy relatively lot of space when parked and/or have a limited steering capabilities at low speeds due to wide track or low range of turn.

The aim of the present invention is to provide a vehicle which can be driven in an easy and stable manner at high speeds, while allowing high maneuvering capabilities at low speeds and requiring little parking space.

DISCLOSURE OF THE INVENTION

The object of the invention is a vehicle comprising a front axle with a pair of front wheels having a track width adjustable between a wide track and a narrow track, a drive rear axle with a rear wheel, steering means configured to control the turn of the rear wheel when the front wheels are set to the narrow track, track width control means configured to change the track width of the front wheels and to change the wheel base between the front axle and the rear axle such that for the wide track of the front wheels the wheel base is longer than for the narrow track of the front wheels.

The steering means can be further configured to control the turn of the front wheels around a substantially vertical axis and of the rear wheel around a substantially vertical axis depending on the track width of the front wheels.

The steering means can be further configured to control the turn of the front wheels when the front wheels are set to the wide track, while the front wheels are non-turnable when set to the narrow track.

The rear wheel can be non-turnable when the front wheels are set to the wide track.

The track width control means may comprise pairs of wishbones connected to each of the front wheels, each pair of wishbones connected pivotally at one point to a central frame and at another point to one end of a push-pull rod, the other end of which is pivotally connected with a piston of a central linear actuator, such that the movement of the piston causes change of the wheel base and the track width of the front wheels.

The track width control means may be configured to turn the front wheels towards the central axis of the vehicle when transitioning from the wide track configuration to the narrow track configuration and to turn the front wheels away from the central axis of the vehicle when transitioning from the narrow track configuration to the wide track configuration.

The track width control means may comprise variable-length steering rods connected to the front wheels.

The track width control means may comprise pairs of wishbones connected to each of the front wheels, each pair of wishbones connected to a retracting arm mounted pivotally at one point to a central frame and at another point to one end of a push-pull rod, the other end of which is pivotally connected with a piston of a central linear actuator, such that the movement of the piston causes change of the wheel base and the track width of the front wheels.

The track width control means may comprise steering rods connected at one end to steering actuators and at another end to steering knuckle bearings of the front wheels to steer the turn of the front wheels around their individual vertical axes, wherein the steering actuators are connected to the central frame and have a changeable length.

The track width control means may comprise pairs of upper and lower front suspension arms connected pivotally at one end to a driving arm and at another end pivotally to a pair of upper and lower rear suspension arms connected pivotally at one end to the central frame and at another end to a steering knuckle bearing of the front wheel, the driving arm being pivotally mounted to the central frame and turnable around a substantially vertical axis at the point of connection to the central frame in order to control the track width of the front wheels and the wheel base of the vehicle.

The vehicle may further comprise a toe control mechanism comprising positioning arms, to which steering rods are mounted for controlling the toe of the front wheels.

The toe control mechanism can be mounted on a base pivotally connected to the vehicle frame via a bearing to allow steering the turn of the front wheels via the steering rods by turning the base.

The front wheels can be turnable around individual axes.

The front wheels can be turnable around a common axis.

The front axle can be turnable by a linear actuator.

The rear wheel can be turnable around an axis offset from the centre of the rear wheel by a distance larger than the radius of the rear wheel.

The rear axle can be turnable by a linear actuator.

The vehicle may further comprise a selector configured to control the operation of both the track width control means and the steering means.

The selector can be coupled with a gear lever.

The vehicle may further comprise a frame comprising a tiltable portion tiltable about a tilt axis and coupled with a drive rear axle with a rear wheel, a non-tiltable portion coupled with a front axle with a pair of front wheels, a main body portion coupled with the tiltable frame portion, tilting means for tilting the tiltable frame portion when the front wheels are set to the wide track.

The tilt axis can lie within the longitudinal vertical plane of symmetry of the vehicle.

The tilting means can be configured to tilt the tiltable frame portion when the front wheels are in the narrow track to a smaller extent than when the front wheels are in the wide track.

The tilting means can be configured to block the tilt of the tiltable frame portion when the front wheels are in the narrow track.

The tilting means may comprise a tilt actuator.

The tilting means may comprise a self-tilting mechanism actuated by turn of the rear wheel.

The longitudinal tilt axis can be inclined with respect to the road surface.

The vehicle may comprise an elastic outer shell forming the cabin of the vehicle and having a width controlled by a linear actuator coupled with linkages such that the width of the cabin is higher for the wide track of the front wheels than for the narrow track of the front wheels.

BRIEF DESCRIPTION OF DRAWINGS

The invention is shown by means of exemplary embodiments on a drawing, in which:

FIGS. 2A, 2B show front views of the vehicle in a wide track and in a narrow track configuration.

FIG. 3A, 3B show perspective visualizations of the vehicle in a wide track and in a narrow track configuration.

FIGS. 19, 20 and 21 show a vehicle with a tiltable frame in a side view, in a front view and in a perspective view, respectively.

FIGS. 23A, 23B show a body of the vehicle with an elastic profile and a profile adjusting mechanism.

MODES FOR CARRYING OUT THE INVENTION

Figure 1A:
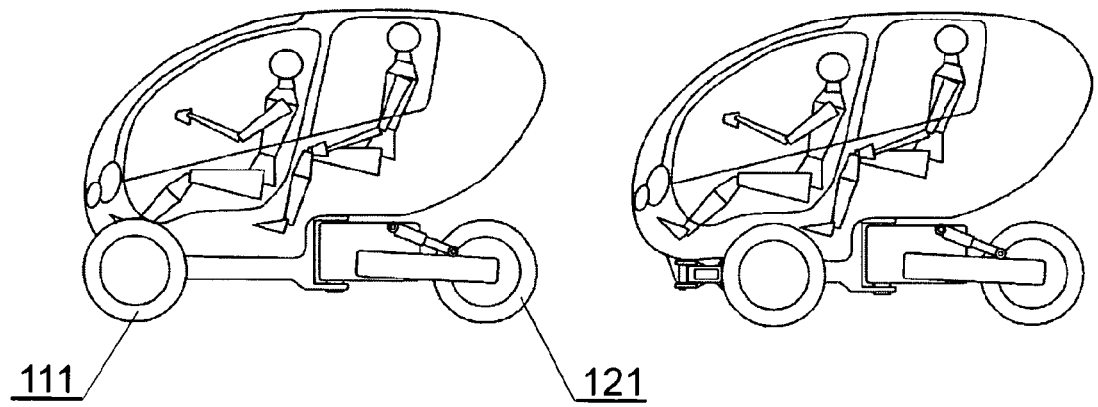
FIGS. 1A-1C show side views of different types of vehicles according to the invention in a wide track configuration, corresponding to a high speed driving mode and in a narrow track configuration, corresponding to a low speed parking mode.
Figure 1B:
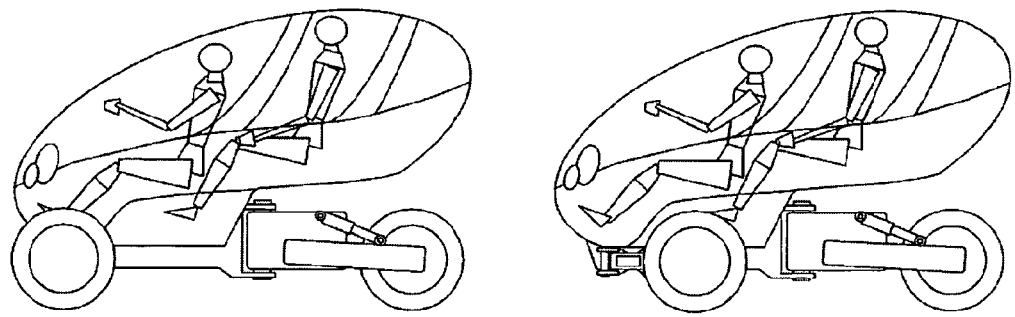
Figure 1C:
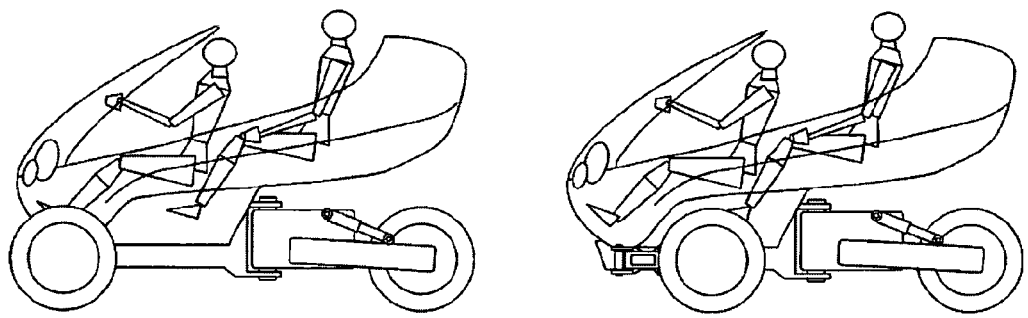

The vehicle according to the invention is shown in side views on FIGS. 1A-1C in a wide track configuration, corresponding to a high speed driving mode, and in a narrow track configuration, corresponding to a low speed parking mode. FIGS. 2A and 2B show a front view of the vehicle in a wide track and a narrow track configuration, respectively. FIGS. 3A and 3B show a perspective view of the vehicle in a wide track and a narrow track configuration, respectively. Preferably, the vehicle is a passenger vehicle for one or two persons, having a width of about 1 m in the narrow track configuration and a length of about 2-3 m. FIG. 1A shows a typical passenger transport vehicle with a closed boot portion, FIG. 1B shows a transport vehicle with a transparent boot portion and FIG. 1C shows an open-roof recreational transport vehicle. The vehicle is preferably a three-wheeled vehicle having a front axle with a pair of front wheels 111, 112 and a rear axle with a rear wheel 121. However, in certain embodiments, the vehicle may have more axles and/or wheels on each axle. The front wheels 111, 112 have a track width adjustable between a wide track, as shown in FIGS. 2A and 3A and a narrow track as shown in FIGS. 2B and 3B. For the wide track of the front wheels 111, 112, the wheel base, i.e. the distance between the front wheels axle and the rear wheel axle, is longer than for the narrow track of the front wheels 111, 112, as seen in FIG. 3A compared to FIG. 3B.

Preferably, in the wide track configuration, the track width of the front wheels equals at least 150% of the track width in the narrow track configuration, i.e. it is substantially wider.

Preferably, in the wide track configuration, the wheel base equals at least 120% of the wheel base in the narrow track configuration, i.e. it is substantially longer.

Such structure allows increasing the stability of the vehicle at higher speeds by setting the front wheels to a wide track and extending the wheel base, while maintaining narrow vehicle dimensions to allow parking in narrow spaces and increasing maneuverability at low speeds, by setting the front wheels to a narrow track and shortening the wheel base.

Figure 4:
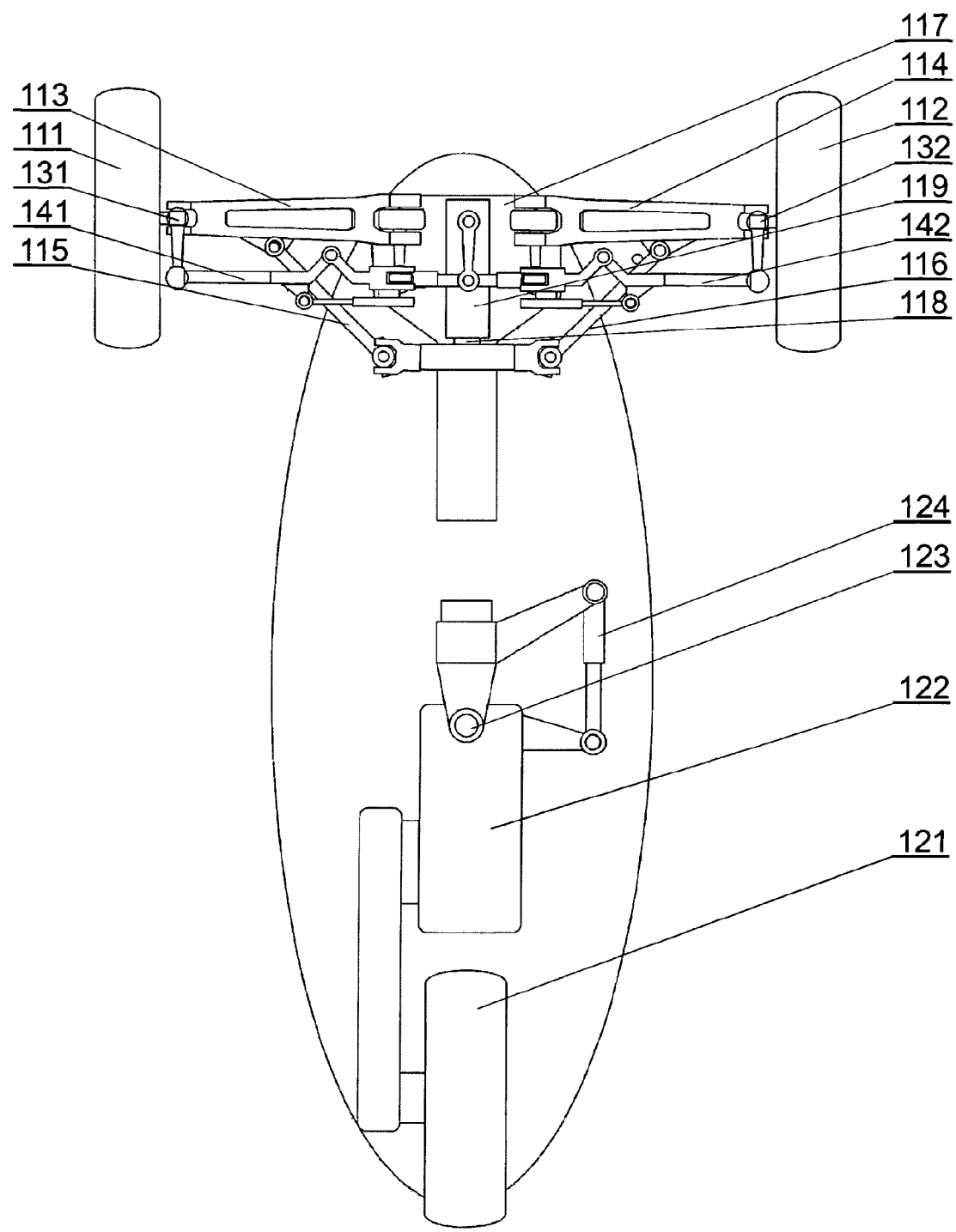
FIG. 4 shows a top view of a first embodiment of a chassis of the vehicle in a wide track configuration.
Figure 5:
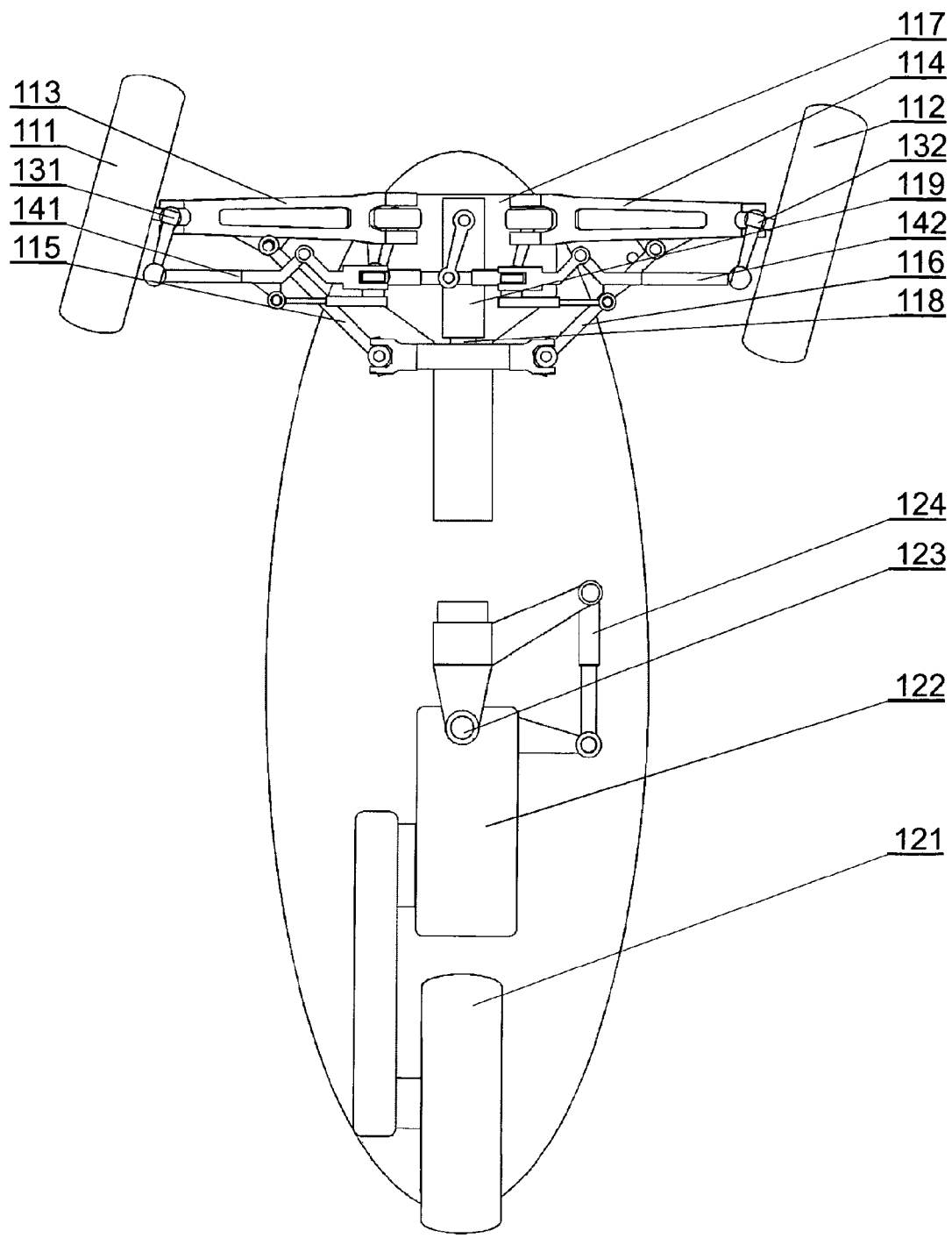
FIG. 5 shows a top view of a first embodiment of a chassis of the vehicle in a wide track configuration with front wheels turned around individual axes.
Figure 6:
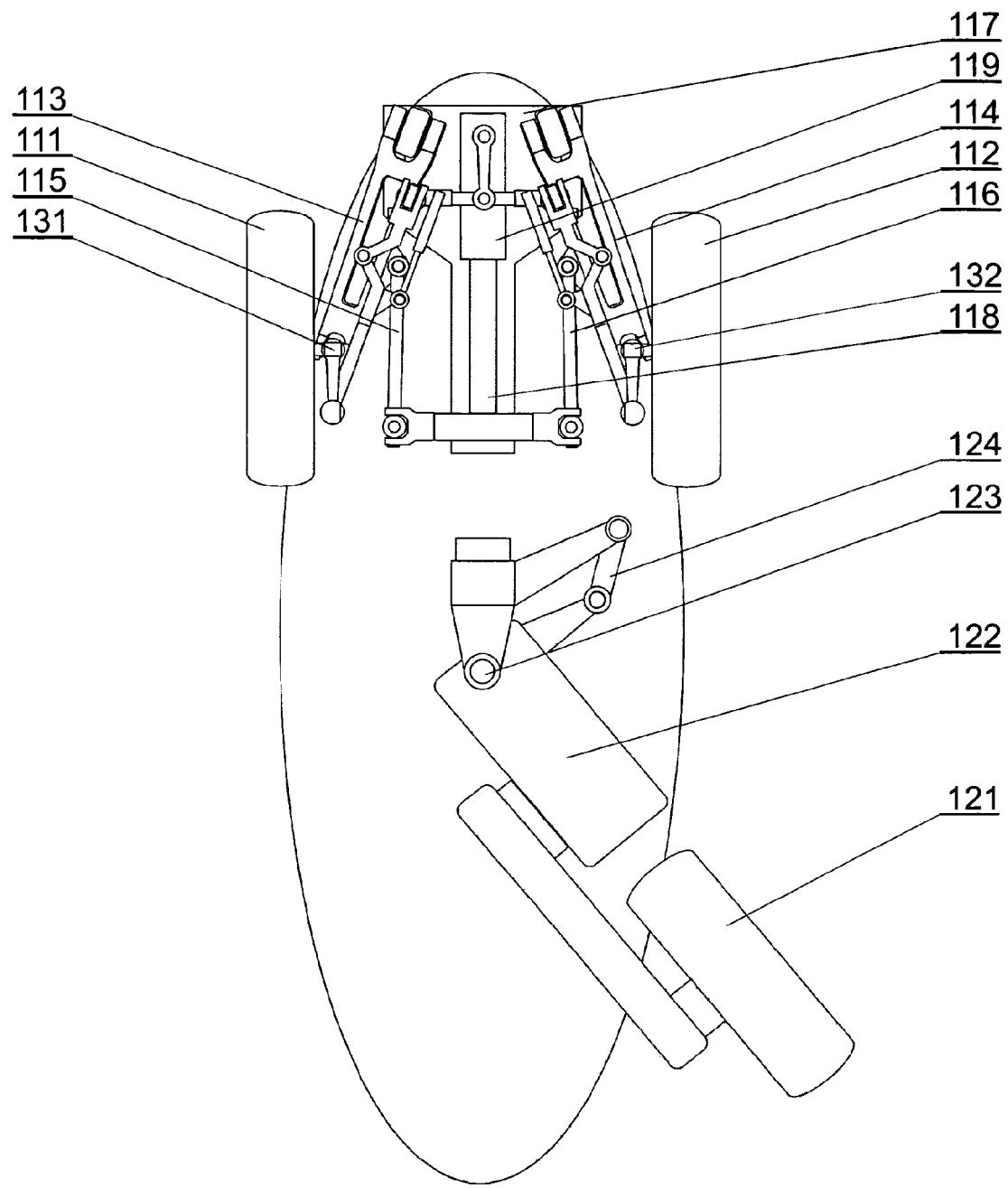
FIGS. 6 and 7 show a top view of a first embodiment of a chassis of the vehicle in a narrow track configuration with the rear wheel turned.
Figure 7:
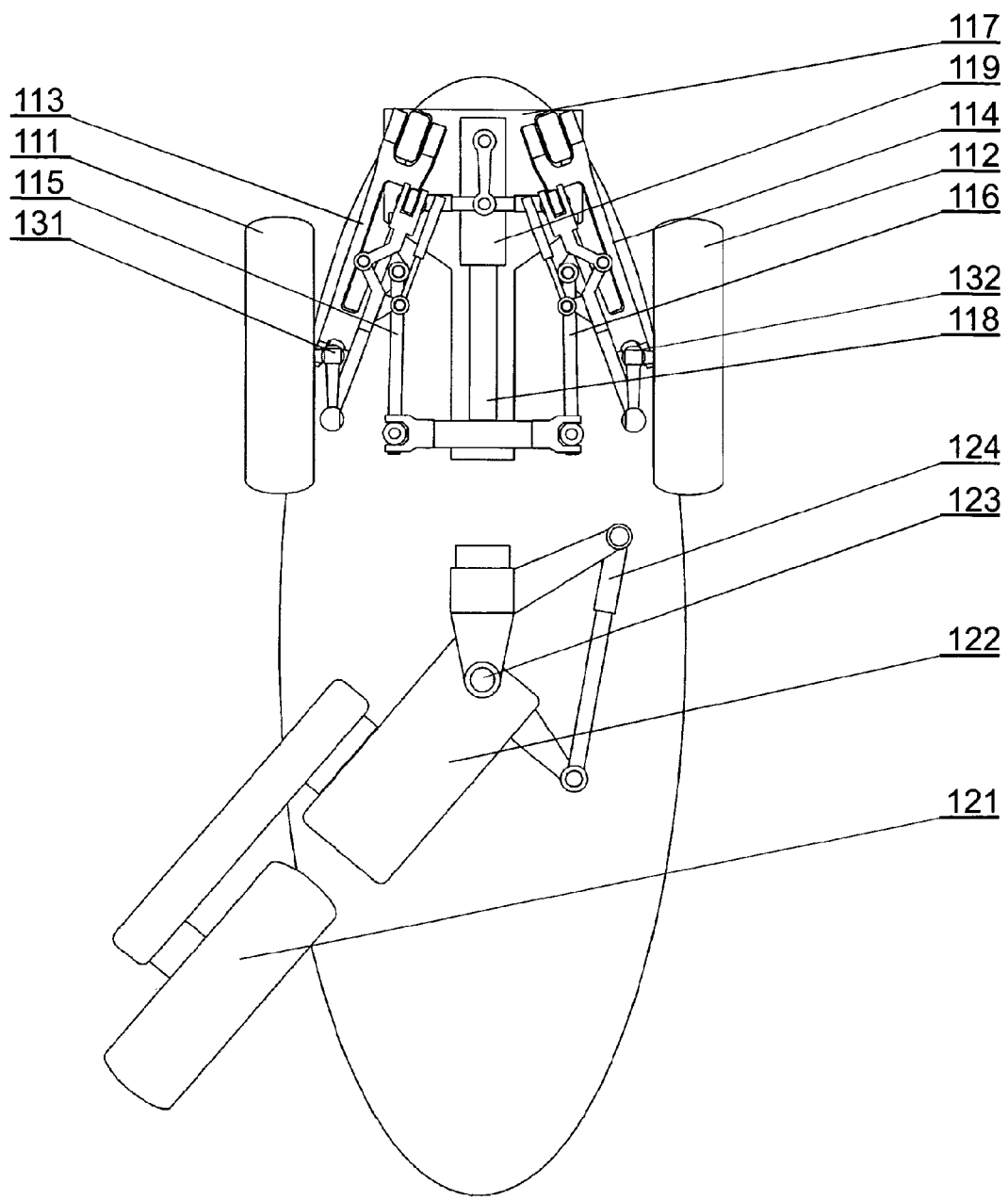

FIG. 4 shows a top view of a first embodiment of a chassis of the vehicle in a wide track configuration. The vehicle chassis comprises a front axle, which is a split axle with a pair of front wheels 111, 112 having a track width adjustable between a wide track, as shown in FIGS. 4 and 5, and a narrow track, as shown in FIGS. 6 and 7. In a simple embodiment, the front wheels may be set to one of the wide or narrow track only. In a more elaborate embodiment, the front wheels may be set to a plurality of positions between the wide track and the narrow track, e.g. depending on the desired speed or comfort. In one embodiment, the track-adjustable front wheels are non-turnable and only the rear wheel is turnable to allow directional steering of the vehicle. In another embodiment, when the front wheels 111, 112 are set to the wide track, the front wheels 111, 112 are turnable around individual axes, defined by steering knuckle bearings 131, 132, as shown in FIG. 5, to allow directional steering of the vehicle at higher speeds via the front wheels. When the front wheels are set to the narrow track, they are non-turnable and the vehicle is directionally steered by turning of the rear wheel. The non-turnable configuration of the front wheels 111, 112 may be activated electrically, e.g. by the central processing unit of the vehicle, or mechanically, by disconnecting or blocking the steering means of the front wheels 111, 112. Due to the fact that the front wheels 111, 112 are non-turnable when set to the narrow track, the front wheels 111, 112 may be brought very close to the vehicle bodywork, without the need to provide extra space for the turn of the wheels in the bodywork, thereby achieving particularly narrow width of the vehicle, as shown in FIGS. 2B and 3B.

The track width of the front wheels 111, 112 is changed by track width control means, which can be configured to change the wheel base between the front axle and the rear axle such that for the wide track of the front wheels 111, 112 the wheel base is longer than for the narrow track of the front wheels 111, 112.

In particular, the track width control means may comprise wishbone pairs 113, 114 connected to the front wheels 111, 112, each wishbone pair 113, 114 connected pivotally at one point to a central frame 117 and at another point to one end of a push-pull rod 115, 116, the other end of which is pivotally connected with a piston 118 of a central linear actuator 119, such that the movement of the piston 118 causes change of the wheel base and the track width of the front wheels 111, 112. The central linear actuator 119 is particularly useful for change of the track width when the vehicle moves with low speed.

Another embodiment of track width control means may comprise, instead of the central linear actuator 119, variable-length steering rods 141, 142 which change their effective length temporarily for time of retraction or extension of the track of the front wheels 111, 112. Increasing the length of the steering rod 141, 142 causes both front wheels 111, 112 to be turned towards the central axis of the vehicle, which during movement of the vehicle is pushing the wheels towards the center of the vehicle and narrowing the track. Shortening the steering rods 141, 142 causes both front wheels 111, 112 to be turned away from the central axis of the vehicle, and causes simultaneous movement of the front wheels 111, 112 outside, thereby widening their track.

The track width control means may also comprise both the variable-length steering rods 141, 142 and the central actuator 119.

Alternatively, apart from the double-wishbone suspension described above, other types of suspension can be used, such as a swingarm suspension or a MacPherson suspension, providing an individual axes of rotation for each wheel.

The vehicle chassis further comprises a rear axle with a rear wheel 121. As shown in FIGS. 6 and 7, the rear wheel 121 is turnable, for example by a linear actuator 124, around an axis defined by a bearing 123 offset from the centre of the rear wheel 121 by a distance larger than the radius of the rear wheel 121, which facilitates maneuvering of the vehicle. If the front wheels are turnable, the rear wheel 121 can be blocked when the front wheels 111, 112 are set to the wide track, so as to steer the vehicle only via the front wheels 111, 112 when the vehicle drives at higher speeds.

The rear axle is a drive axle of the vehicle, coupled with an engine 122. The front axle can be a dead axle.

The vehicle further comprises steering means, e.g. a steering wheel, not shown in the drawing for simplicity, configured to control the turn of the rear wheel 121. In the embodiment wherein the front wheels are turnable, the same steering means may be also used to control the front wheels 111, 112 when the front wheels 111, 112 are set to the wide track. In a particular embodiment, the steering means may be configured to control the turn of the front wheels 111, 112 when the front wheels 111, 112 are set to the wide track and to control the turn of the rear wheel 121 when the front wheels 111, 112 are set to the narrow track. The term "turn" is to be understood as the turn of the wheels around a non-horizontal axis, preferably around a substantially vertical axis. In another embodiment, the turn of the front wheels 111, 112 and the rear wheel 121 may be controlled simultaneously, when the front wheels 111, 112 are not set to the narrow track. In another embodiment only rear wheel 121 is controlled irrespective of the track of the front wheels 111, 112 The steering means can be coupled and decoupled with the front wheels 111, 112 and the rear wheel 121 in any conventional mechanical or electrical manner.

Figure 8:
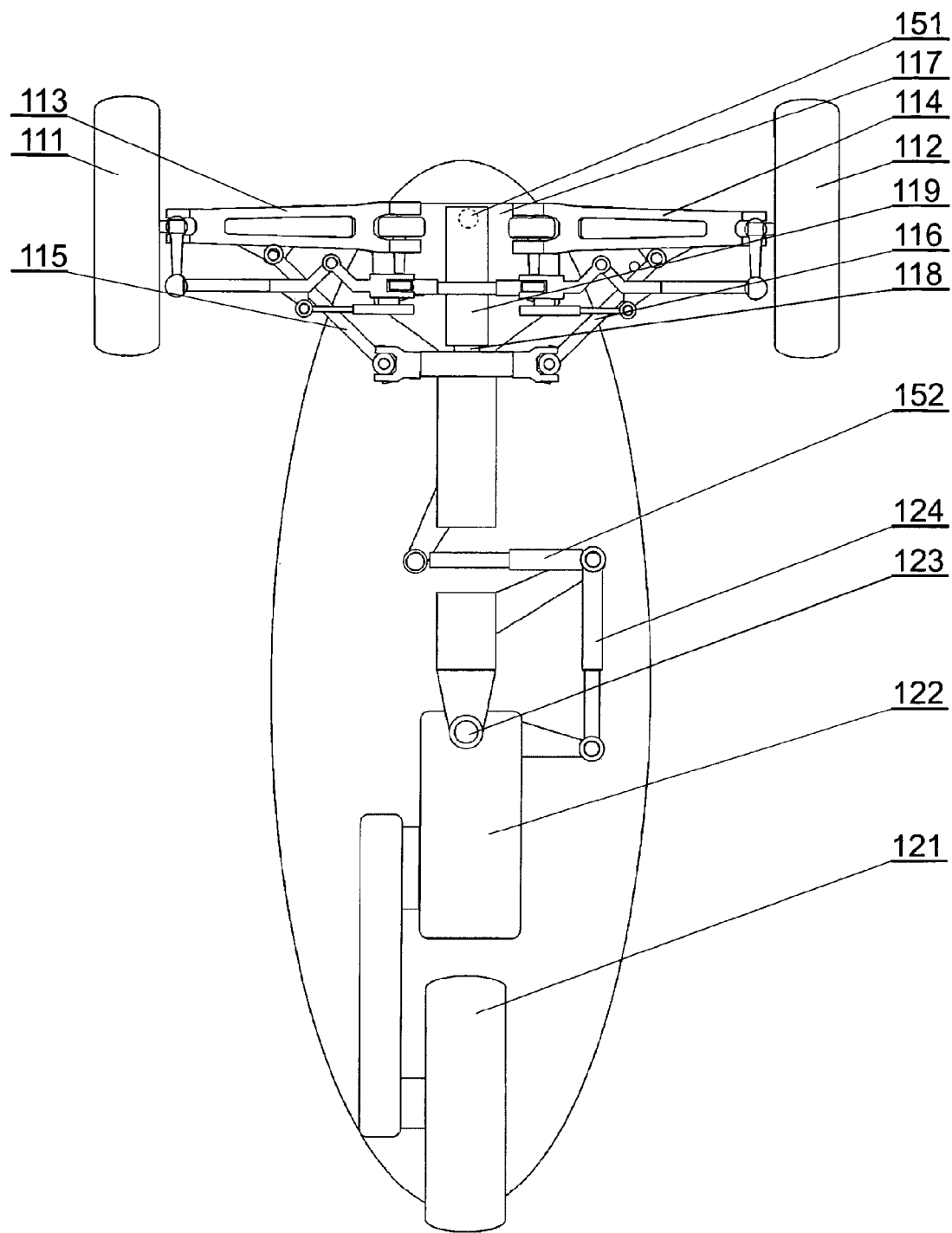
FIGS. 8 and 9 show a top view of a second embodiment of the chassis with front wheels turnable around a common axis.
Figure 9:
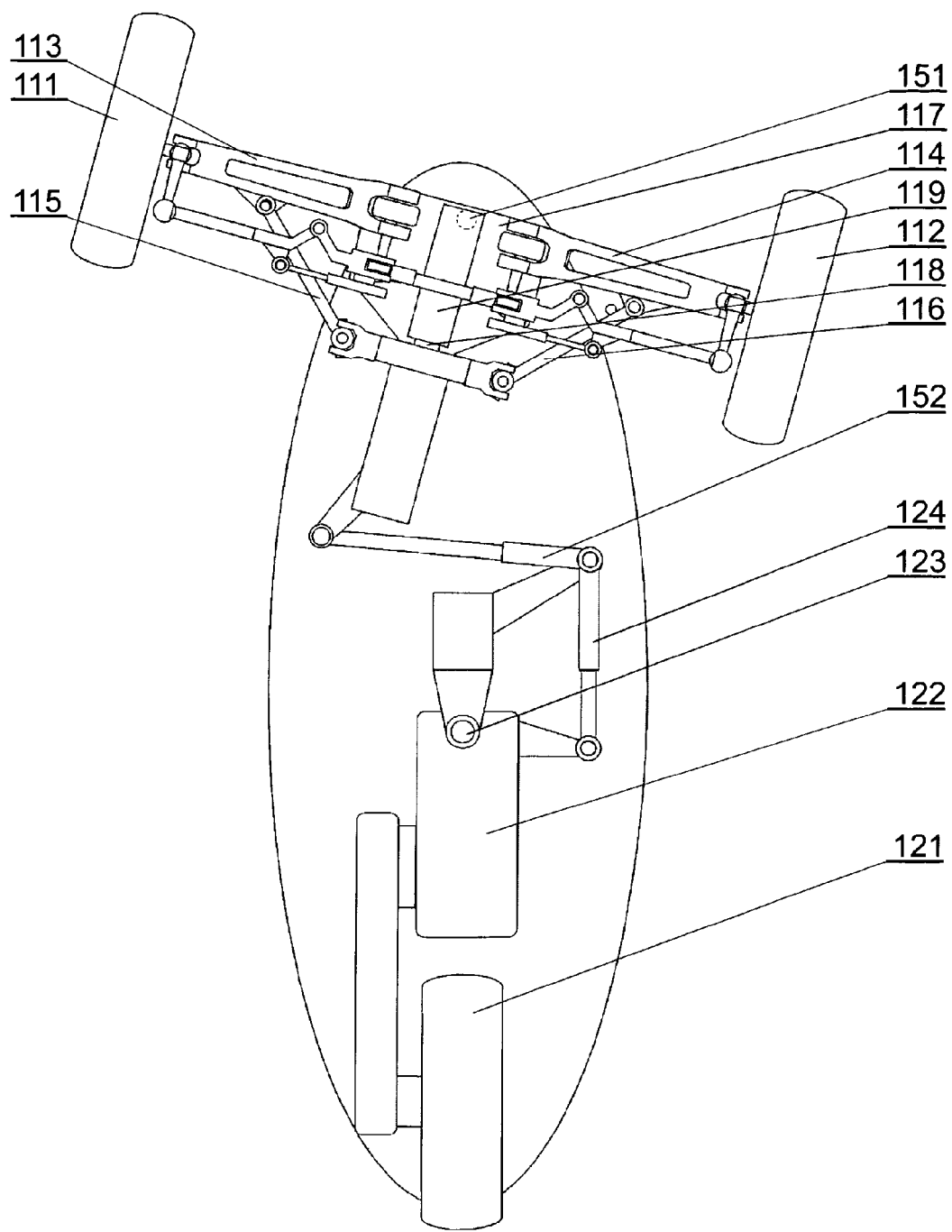

FIGS. 8 and 9 show a top view of a second embodiment of the chassis with front wheels turnable around a common axis.

The chassis has a front axle with a pair of front wheels 111, 112 having a track width adjustable between a wide track and a narrow track in a way analogous to the first embodiment shown in FIGS. 4-7. Therefore, the numerical references on FIGS. 8 and 9 relate to the same or similar elements as in FIGS. 4-7. However, in the second configuration the front wheels 111, 112 are turnable around a common axis, for example around a bearing 151 around which the whole front axle is turnable by means of a linear actuator 152. Extension of the linear actuator 152 causes rotation of the front axle to the right, as shown in FIG. 9, while contraction of the linear actuator 152 causes rotation of the front axle to the left. Such configuration simplifies the wheels turning mechanism.

The rear axle in the second configuration can have the same construction and operating principles as that described with respect to the first configuration and shown in FIGS. 6 and 7.

Figure 10:
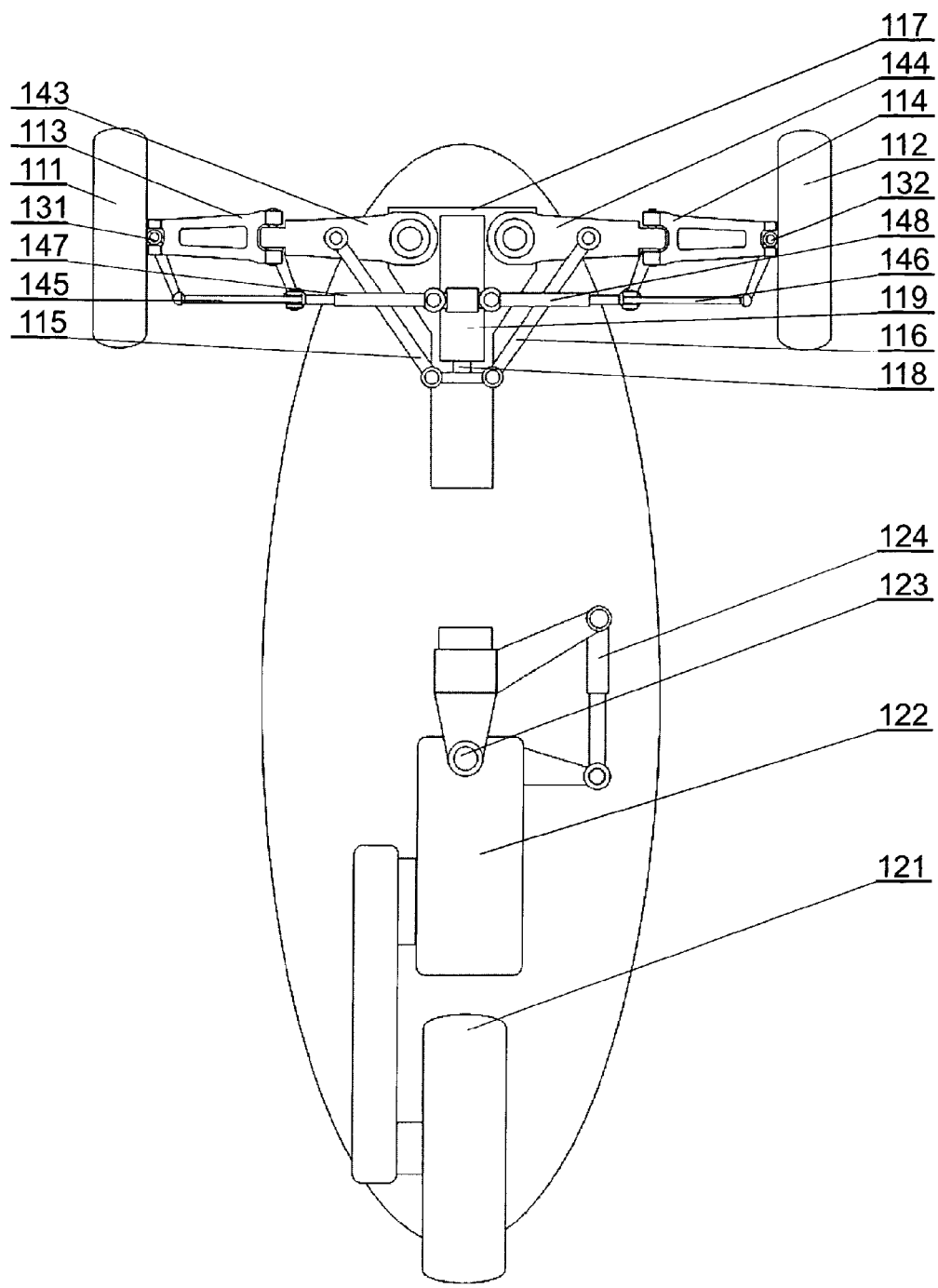
FIG. 10 shows a top view of a third embodiment of a chassis of the vehicle in a wide track configuration.

FIG. 10 shows a top view of a third embodiment of a chassis of the vehicle, in a wide track configuration. It differs from the first embodiment shown in FIG. 4 in the configuration of the track width control means. As shown in FIG. 10, the track width control means comprise wishbone pairs 113, 114 connected to the front wheels 111, 112 and mounted on retracting arms 143, 144. Each retracting arm 143, 144 is connected pivotally at one point to a central frame 117 and at another point to one end of a push-pull rod 115, 116, the other end of which is pivotally connected with a piston 118 of a central linear actuator 119, such that the movement of the piston 118 causes change of the wheel base and the track width of the front wheels 111, 112.

The track width control means may also comprise, instead or in addition to the central linear actuator 119, steering rods 145, 146 connected at one end to steering actuators 147, 148 and at another end to the steering knuckle bearings 131, 132 to steer the turn of the wheels around their individual axes. The steering actuators 147, 148 are connected at another end to the central frame 117 and change their effective length to control the turn of the front wheels, as shown in details in the following figures.

Figure 11A:
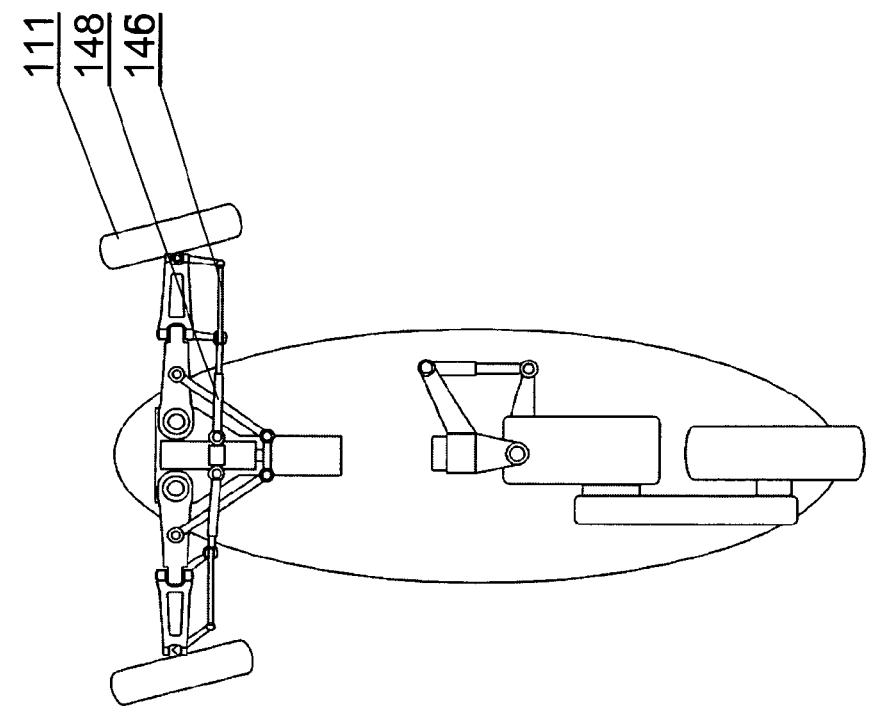
FIGS. 11A-11B show a top view of the chassis of the vehicle of FIG. 10 in a wide track configuration while turning to the right and left, respectively.
Figure 11B:
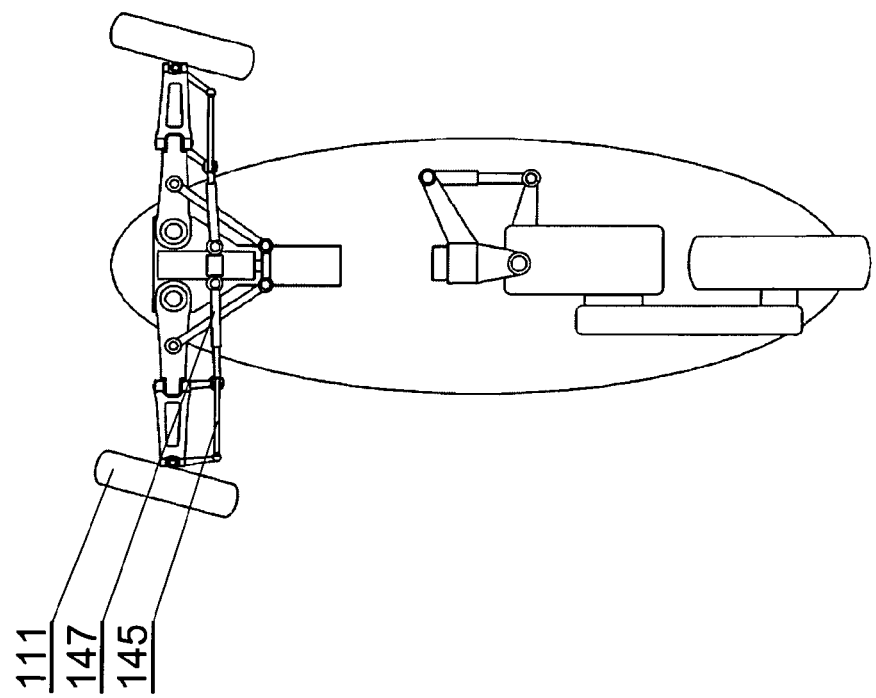

FIGS. 11A-11B show a top view of the chassis of the vehicle of FIG. 10 in a wide track configuration while turning to the right and left, respectively. When the vehicle is to be turned to the right, as shown in FIG. 11A, the left steering actuator 147 is extended and the right steering actuator 148 is contracted, which causes movement of the left push-pull rod 145 to the left and of the right push-pull rod 146 to the right, and respective turn of both wheels 111, 112 about their vertical axes of rotation to the right. On the other hand, when the vehicle is to be turned to the left, as shown in FIG. 11B, the left steering actuator 147 is contracted and the right steering actuator 148 is extended, which causes movement of the left push-pull rod 145 to the right and of the right push-pull rod 146 to the left, and respective turn of both wheels 111, 112 about their vertical axes of rotation to the left.

Figure 12C:
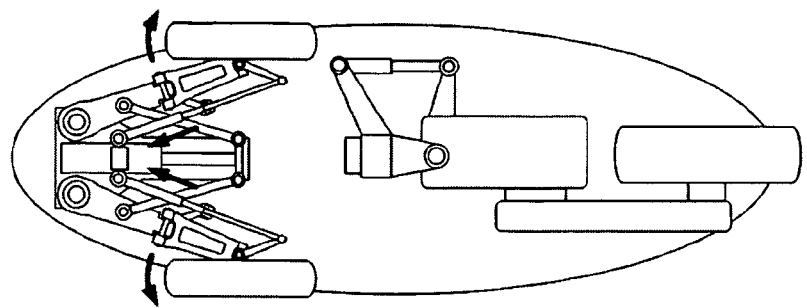
FIGS. 12A-12C show a top view of a chassis of the vehicle of FIG. 10 during transition form a wide track configuration to a narrow track configuration.
Figure 12B:
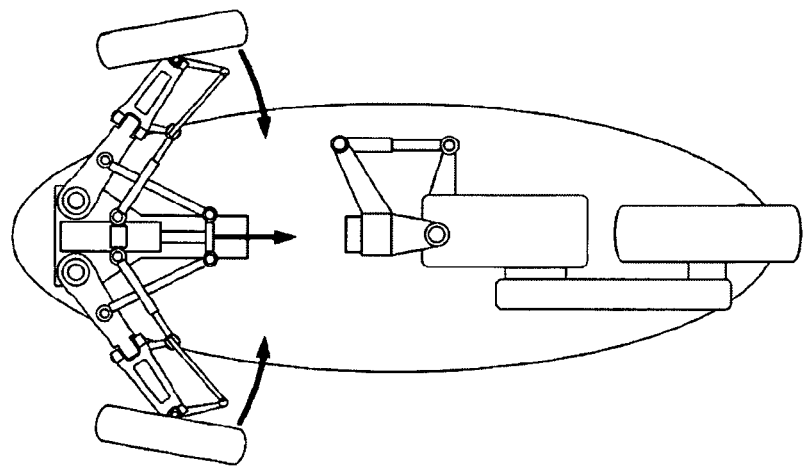
Figure 12A:
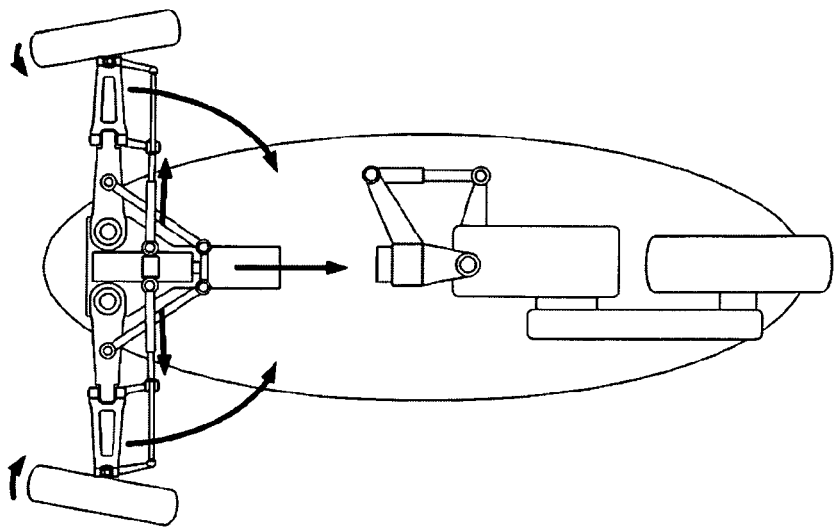

FIGS. 12A-12C show a top view of a chassis of the vehicle of FIG. 10 during transition form a wide track configuration to a narrow track configuration, i.e. transition from a high speed driving mode to a low speed parking mode while the vehicle is moving. First, as shown in FIG. 12A, both steering actuators 147, 148 extend, which causes turn of both front wheels 111, 112 towards the central longitudinal axis of the vehicle. As the wheels 111, 112 are turned and the vehicle is moving, the traction of the vehicle and extension of the piston 118 of the central actuator 119 causes narrowing of the track of the front wheels 111, 112. As shown in FIG. 12B, the front wheels 111, 112 move towards the rear wheel 121, thereby simultaneously shortening the track width of the front wheels 111, 112 and the wheel base between the front wheels 111, 112 and the rear wheel 121. In the final phase of transition, as shown in FIG. 12C, after the piston 118 of the central actuator 119 reaches its fully extended position, the steering actuators 147, 148 contract in order to turn the front wheels 111, 112 to a straight position, parallel to the longitudinal axis of the vehicle.

The mechanism described above effects change of wide track configuration to narrow track configuration while the vehicle moves, by means of controlling the steering actuators 147, 148, which requires relatively little power. It is also possible to change the configuration from wide track to narrow track and vice versa while the vehicle is stationary—the central actuator 119 may be activated in order to force the wheels to change their position, which requires more power, but improves the level of control over the wheels' movement and position.

Figure 13C:
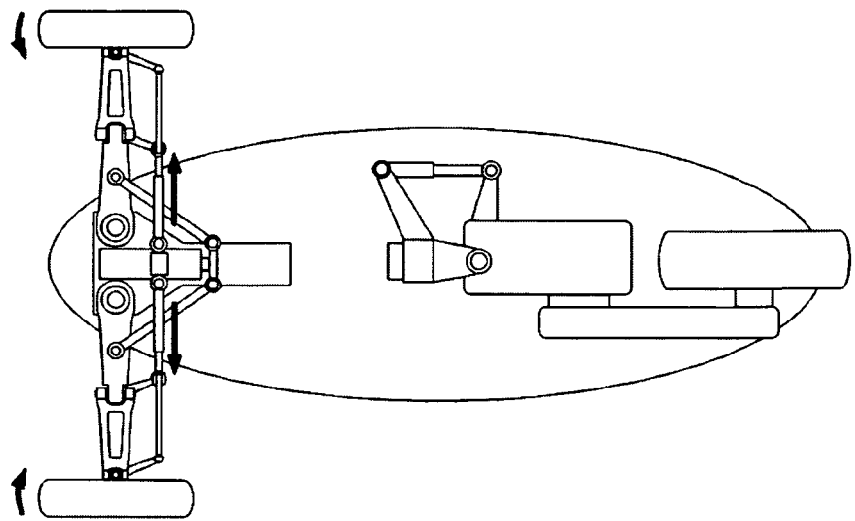
FIGS. 13A-13C show a top view of a chassis of the vehicle during to transition form a narrow track configuration to a wide track configuration.
Figure 13B:
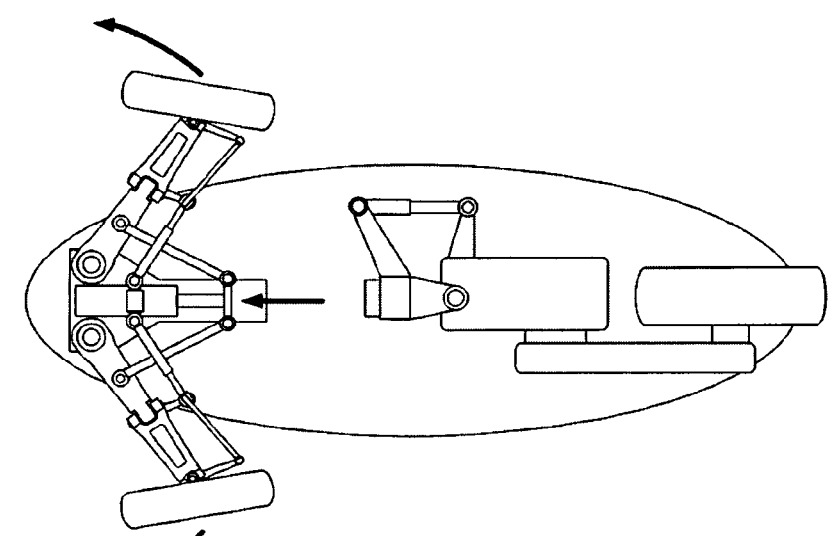
Figure 13A:
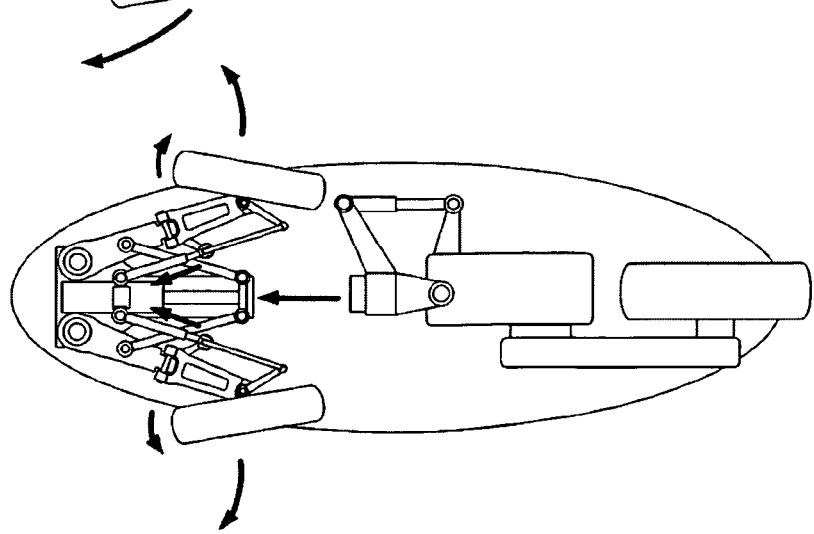

FIGS. 13A-13C show a top view of a chassis of the vehicle during transition form a narrow track configuration to a wide track configuration, i.e. transition from a low speed parking mode to a high speed driving mode while the vehicle is moving. First, as shown in FIG. 13A, both steering actuators 147, 148 contract, which causes turn of both front wheels 111, 112 away from the central longitudinal axis of the vehicle. As the wheels 111, 112 are turned and the vehicle is moving, the traction of the vehicle and contraction of the piston 118 of the central actuator 119 causes widening of the track of the front wheels 111, 112. As shown in FIG. 13B, the front wheels 111, 112 move away from the rear wheel 121, thereby simultaneously extending the track width of the front wheels 111, 112 and the wheel base between the front wheels 111, 112 and the rear wheel 121. In the final phase of transition, as shown in FIG. 13C, after the piston 118 of the central actuator 119 reaches its fully contracted position, the steering actuators 147, 148 extend in order to turn the front wheels 111, 112 to a straight position, parallel to the longitudinal axis of the vehicle.

Figure 14A:
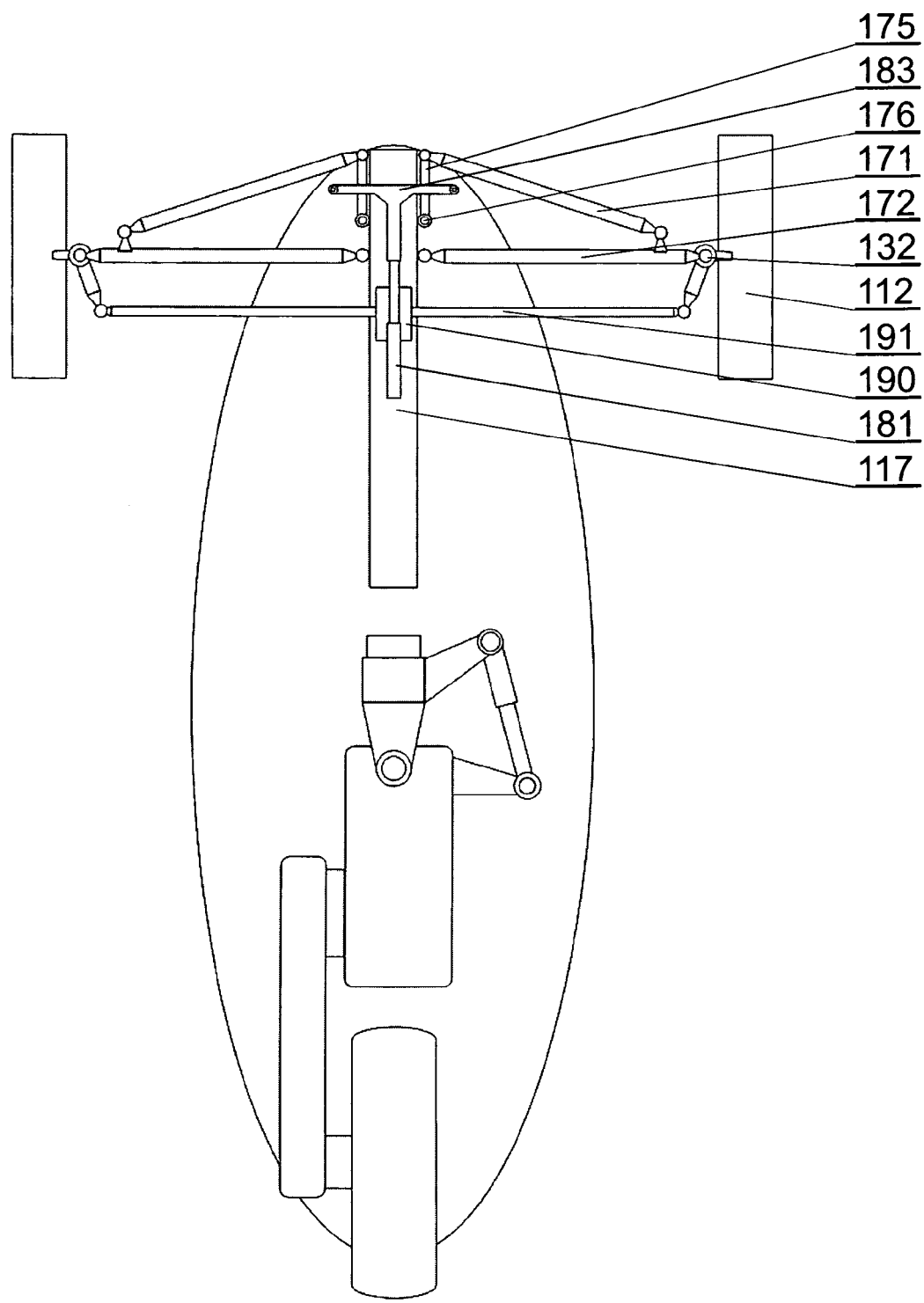
FIGS. 14A-14C show a top view of a fourth embodiment of a chassis of the vehicle, in a wide track configuration, during a transition and in a narrow track configuration.
Figure 14B:
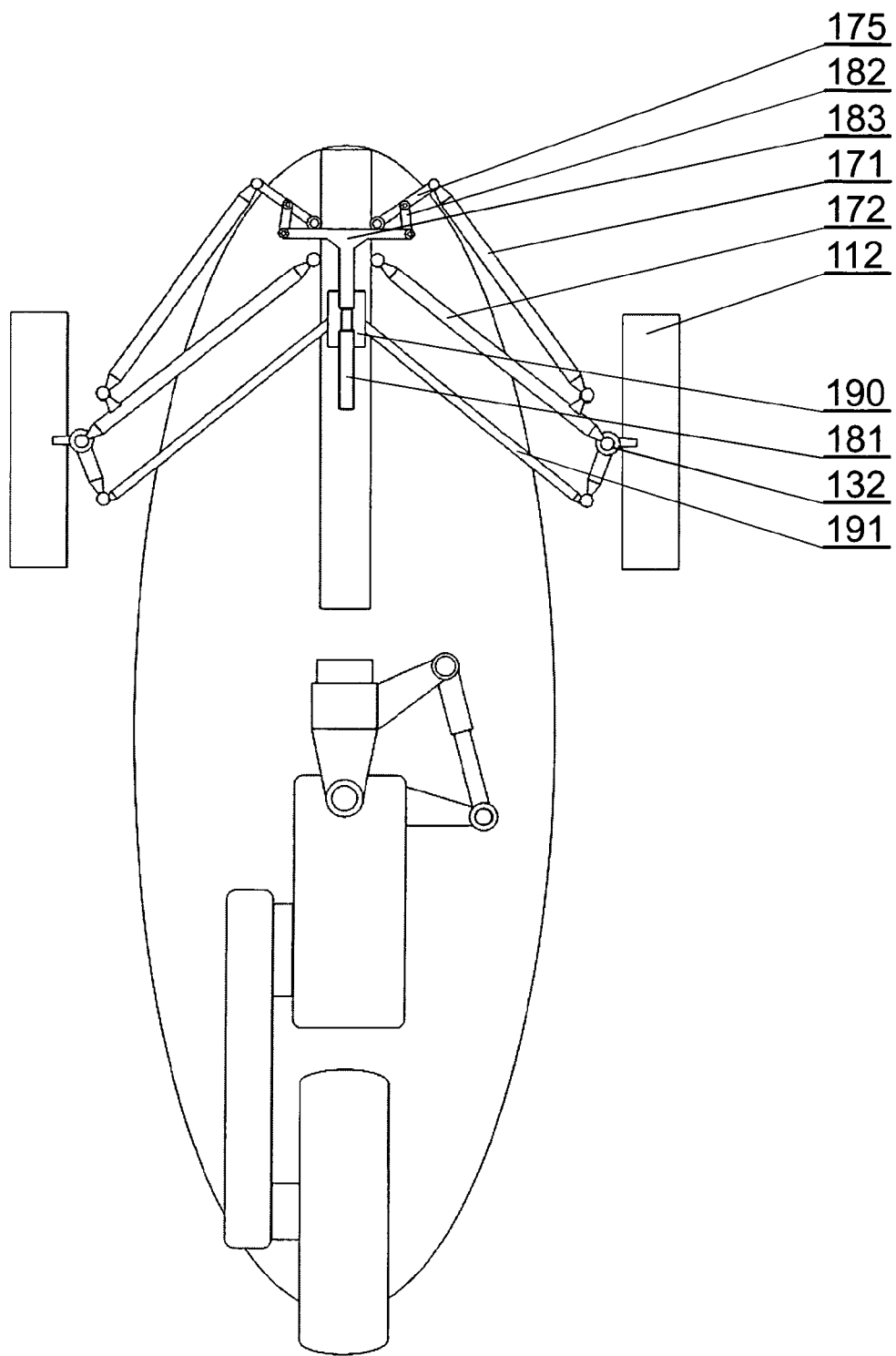
Figure 14C:
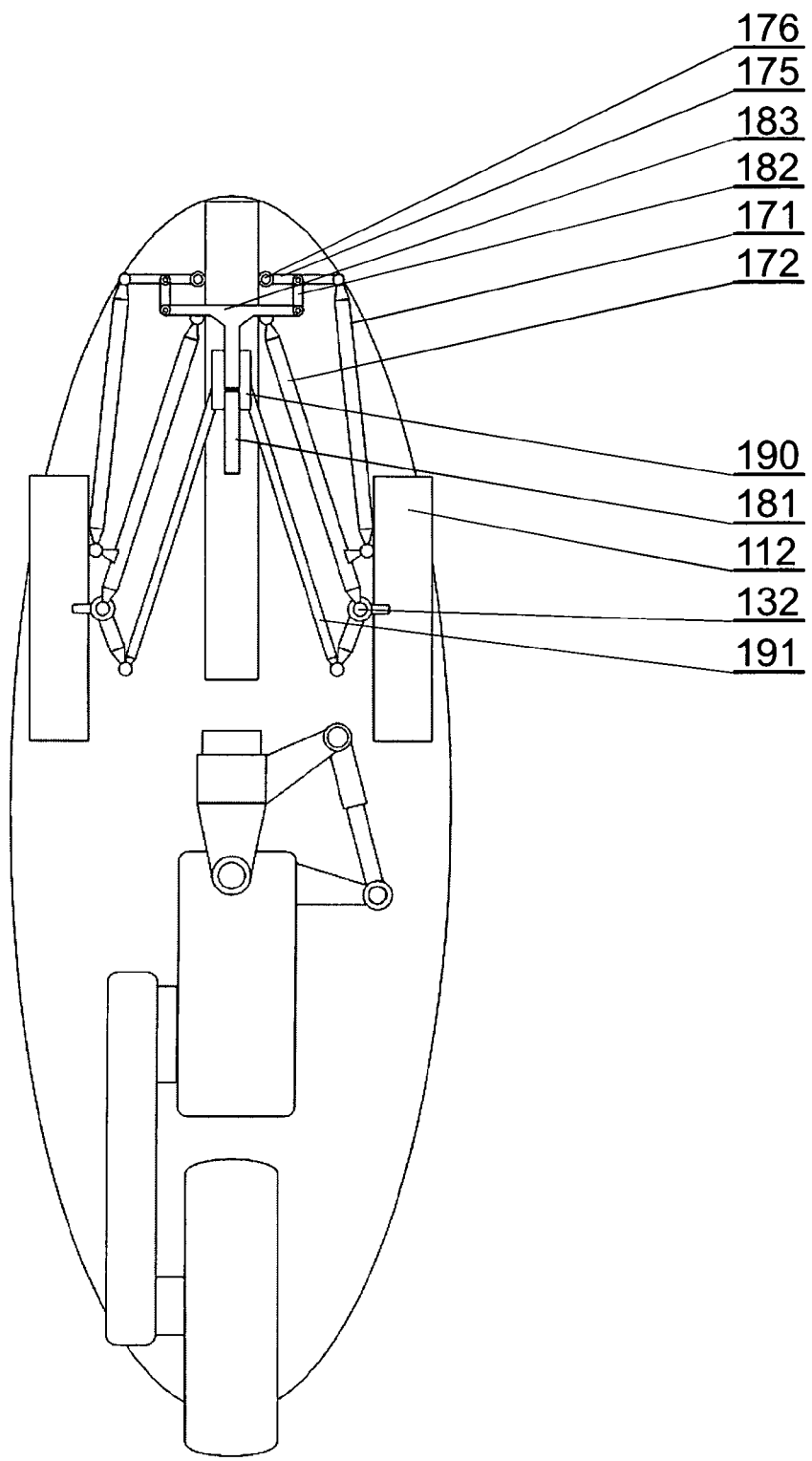
Figure 15A:
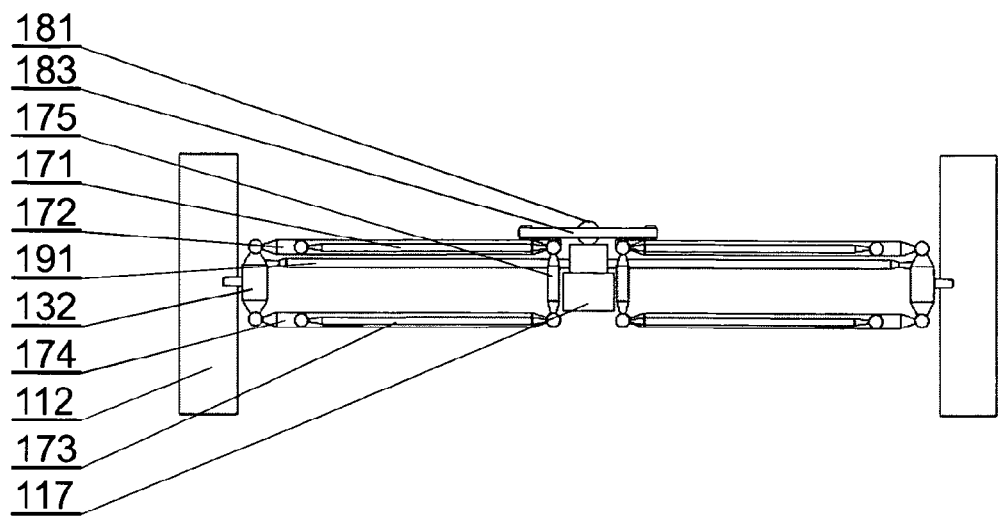
FIGS. 15A, 15B show the fourth embodiment in a front view in a wide track and in a narrow track configuration.
Figure 15B:
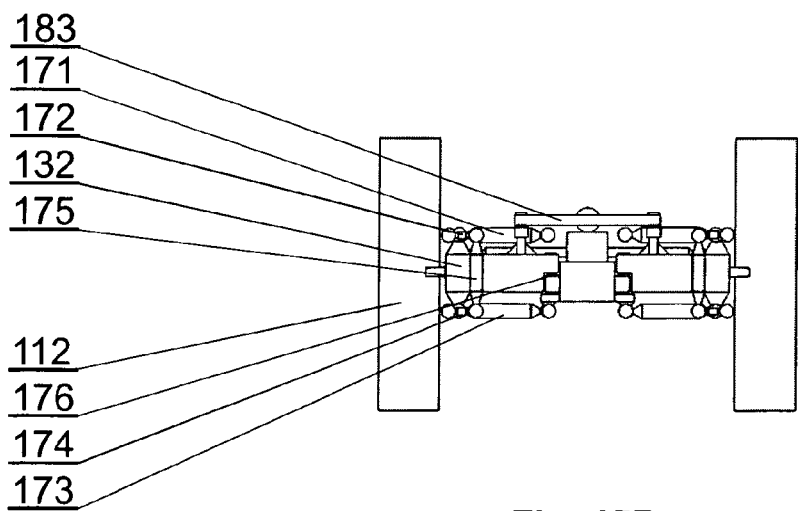

FIGS. 14A-14C show a top view of a fourth embodiment of a chassis of the vehicle, considered as the best mode for carrying out the invention, in a wide track configuration, during a transition and in a narrow track configuration. FIGS. 15A, 15B show the fourth embodiment in a front view in a wide track and in a narrow track configuration. The chassis comprises a front suspension comprising four suspension arms 171-174 for each of the front wheels 111, 112. There are two upper arms 171, 172 and two lower arms 173, 174. Each pair of lower arms 173, 174 and upper arms 171, 172 consists of a front arm 171, 173 and of a rear arm 172, 174. The front suspension arms 171, 173 are pivotally connected to a driving arm 175 on one end and—also pivotally—to a certain point of the rear arm 172, 174 at the other end. The rear arms 172, 174 are connected pivotally to vehicle's frame 117 on one end and—also pivotally—to the steering knuckle bearings 132 on the other. The driving arm 175 is connected to the vehicle's frame 117 via a hinge 176 having a substantially vertical turn axis. The driving arm 175 is turnable around the hinge 176 such that it can take a plurality of positions between its foremost position corresponding to the wide track configuration of the front suspension of the vehicle as shown in FIGS. 14A and 15A and its rearmost position corresponding to the narrow track configuration of the vehicle's suspension as shown in FIGS. 14C and 15B. The movement and the position of the driving arms 175 are controlled by the vehicles central processing unit and a set of electromechanical linkages. FIGS. 14A-14C and 15A-15B show one exemplary embodiment of such system. It comprises a central linear actuator 181 and push-pull connection rods 182 connected each at one end to a "T" shaped element 183 at the end of the central linear actuator 181 and to a certain point of the driving arm 175 at the other end. In such embodiment the position of the driving arms 175 is controlled by the position of the linear actuator 181 along its longitudinal axis. If the linear actuator 181 takes its most extended position, as shown in FIGS. 14A and 15A, the driving arms 175 take their foremost position, corresponding to the vehicle's wide track configuration, corresponding to a high speed driving mode. If the linear actuator 181 takes its most contracted position, the driving arms 175 take their rearmost position corresponding to the vehicle's narrow track configuration, corresponding to a low speed parking mode. The transition between the end positions of the linear actuator 181, as shown in FIG. 14B, corresponds to transition between vehicle's narrow track and wide track configurations.

The rear suspension and the steering of the rear wheel are in this embodiment equivalent to that described with respect to the previous embodiments.

The front wheels 111, 112 in this embodiment can be turnable along a substantially vertical axis to help transition between the wide track and narrow track configurations and for the purposes of directional steering of the vehicle in the manner equivalent to that described with respect to the previous embodiments.

In the particular embodiment, the directional control of the front wheels 111, 112 of the vehicle can be implemented by means of a toe control mechanism (only the base 190 of which was indicated by reference 190 on FIG. 14A-14C for simplicity of the drawing) and as shown in details FIGS. 16A-16F indicating a top view and a front view. The mechanism comprises steering rods 191, which are pivotally connected the steering knuckle arms 192 on one end and to positioning arms 193 on the other. The positioning arms 193 are connected via push-pull rods 194 with a linear actuator 195. The base 190 of the toe control mechanism can be connected to the chassis of the vehicle by a bearing 196.

Figure 16C:
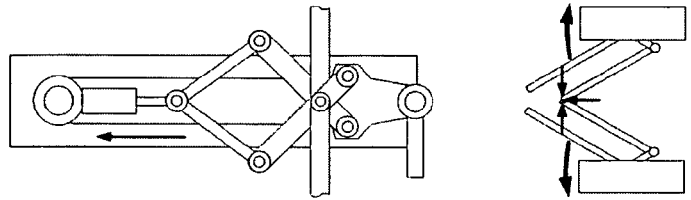
FIGS. 16A-16F show the details of a toe control mechanism.
Figure 16B:
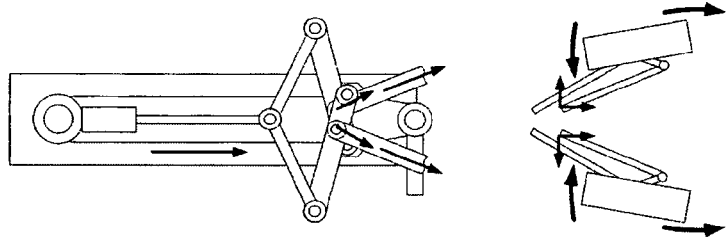
Figure 16A:
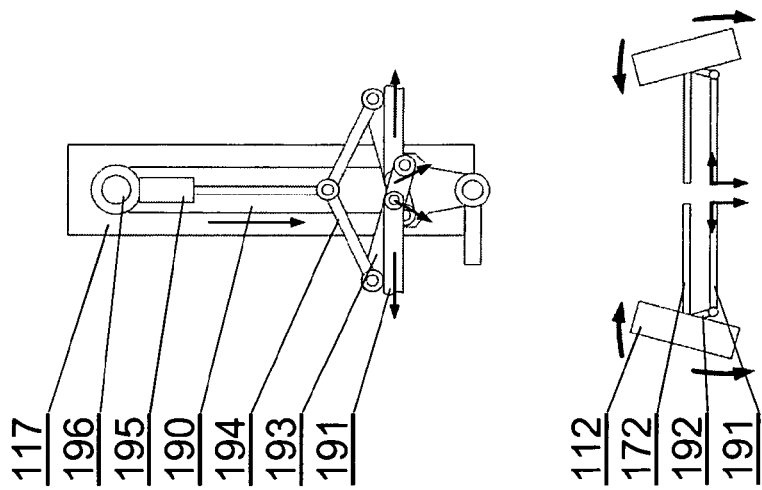
Figure 16F:
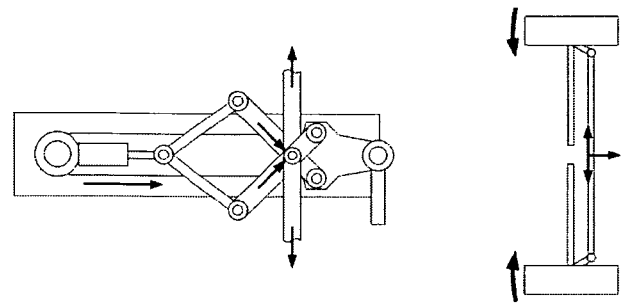
Figure 16E:
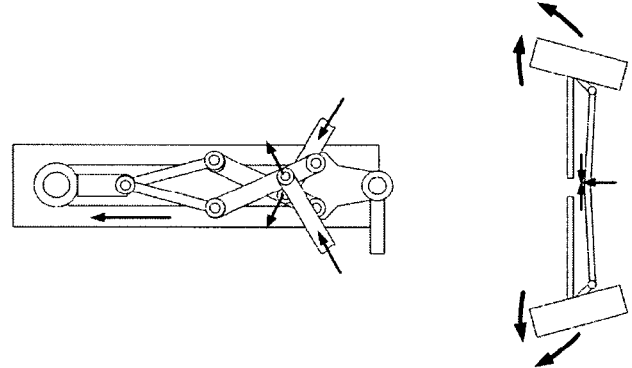
Figure 16D:
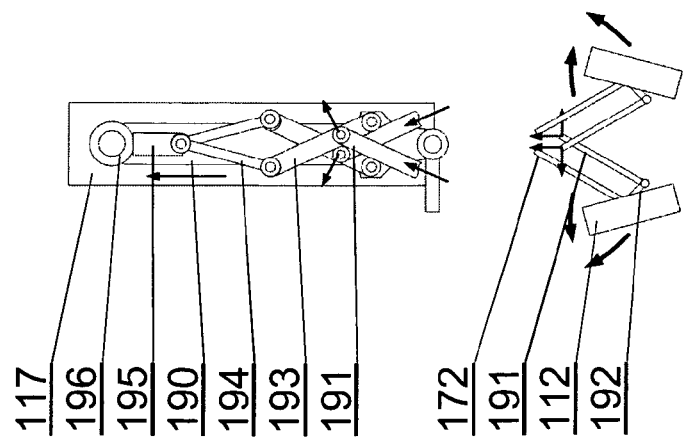

As shown on the FIGS. 16A-16F, in order to turn the front wheels towards the center of the vehicle (positive toe), for transition form the wide track configuration to the narrow track configuration, the linear actuator 195 extends, moving the ends of the positioning arms 193 outside and rearwards. The resulting displacement of the steering rods 191 pushes the steering knuckle arms 192 and the front wheels 111, 112 are turned towards the center of the vehicle i.e. their toe becomes positive as shown in FIG. 16A. The wheels 111, 112 are then pushed towards the center and the rear of the vehicle, as shown in FIG. 16B. Importantly the "inwardly" turned position, or positive toe, is maintained throughout the wheels' travel from their foremost extracted position to their rearmost retracted position. After reaching the extended position the linear actuator 195 retracts, moving the positioning arms 193 back to their neutral position and subsequently the wheels 111, 112 return to their regular toe position substantially parallel to the vehicle's longitudal axle, as shown in FIG. 16C. Analogically, in order to execute transition from the narrow track configuration to the wide track configuration, the linear actuator 195 contracts, moving the ends of the positioning arms 193 towards the center of the vehicle and forwards, as shown in FIG. 16D. The resulting displacement of the steering rods 191 pulls the steering knuckle arms 192 and the front wheels 111, 112 are turned outside of the center of the vehicle, as shown in FIG. 16E. The wheels 111, 112 are then pushed outside of the center and towards the front of the vehicle. The "outwardly" turned position, or negative toe, is maintained throughout the wheels' travel from their rearmost retracted position to their foremost extracted position. After wheels reach their extracted position, the linear actuator 195 extends, moving the positioning arms 193 back to their neutral position and subsequently the wheels 111, 112 return to their regular toe position substantially parallel to the vehicle's longitudal axle, as shown in FIG. 16F.

There are other possible embodiments of the toe control system such as one including a roman screw driven by an electrical engine.

Figure 17C:
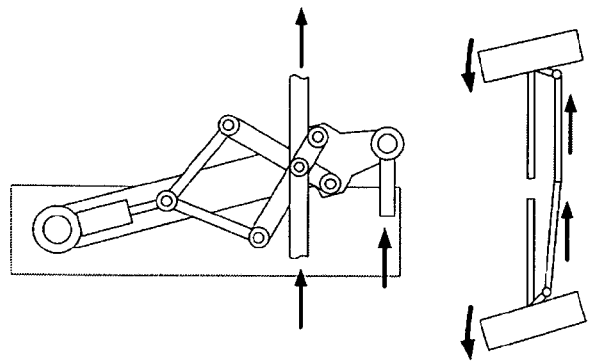
FIGS. 17A-17C show one embodiment of directional steering of the front wheels.
Figure 17B:
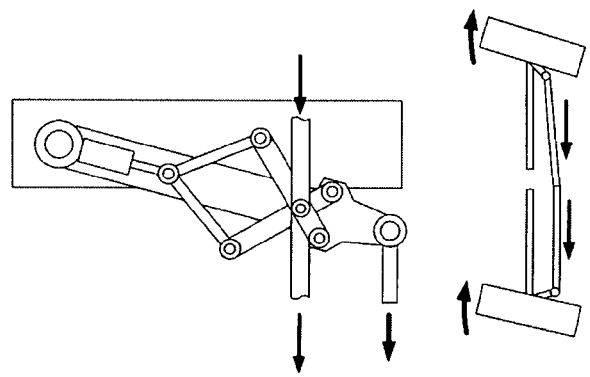
Figure 17A:
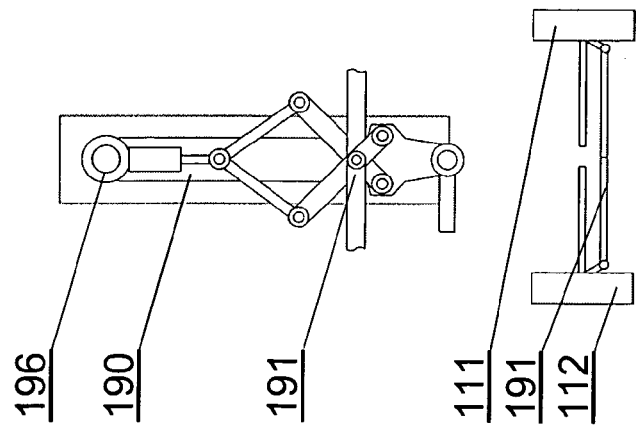

In one embodiment, shown on FIG. 17A-17C the front wheels are used for directional steering when in wide track configuration. In such case the directional steering can be obtained by means of turning the front wheels 111, 112 in the same direction depending on the desired direction of the turn of the vehicle. Such turn can be obtained by turning the base 190 of the toe control mechanism assembly around an axis defined by bearing 196. If the assembly is turned clockwise as shown on FIG. 17B, the wheels 111, 112 are also turned clockwise through the movement of the steering rods 191 and the vehicle turns right. The anticlockwise turn of the toe control assembly has corresponding opposite effects, as shown in FIG. 17C. The turn of the steering assembly can be initiated by a standard steering mechanisms such as rack and pinion or a recirculating ball.

The specific angles shown on FIGS. 14-17 have been exaggerated for the purposes of presentation and clarity. In realistic conditions, toe control transition between specific driving modes as well as turning in the high speed driving mode require only little movements of specific elements of the suspension, typically within several degrees.

The vehicle according to the above embodiments may be operated in the following way. When the vehicle is to be driven at high speed, the front wheels may be set to the wide track and the vehicle can be controlled via the steering means configured to control the turn of the front wheels and/or of the rear wheel. Such "driving mode" provides good stability for the vehicle. When the vehicle is to be parked at a narrow space or driven slowly in space-constrained conditions, the front wheels may be set to the narrow track and the vehicle can be controlled via the steering means configured to control the turn of the rear wheel. Such "parking mode" provides narrow dimensions of the vehicle and good maneuvering capabilities. Therefore, the vehicle can be easily parked in narrow parking spaces. When the wheel base shortens for a narrower front track width, the turning radius decreases and the maneuvering capabilities are further increased.

The operation of both the track width control means and the steering means may be controlled by a common selector to be activated by the vehicle driver. The selector may be set to the "parking mode" or to the "driving mode". The selector can be a dedicated switch on the vehicle dashboard. Optionally, the selector can be coupled with a gear lever, wherein the "parking mode" can be coupled with a dedicated position of the gear lever or the reverse gear position and the "driving mode" can be coupled with the position indicating a forward gear.

Figure 18:
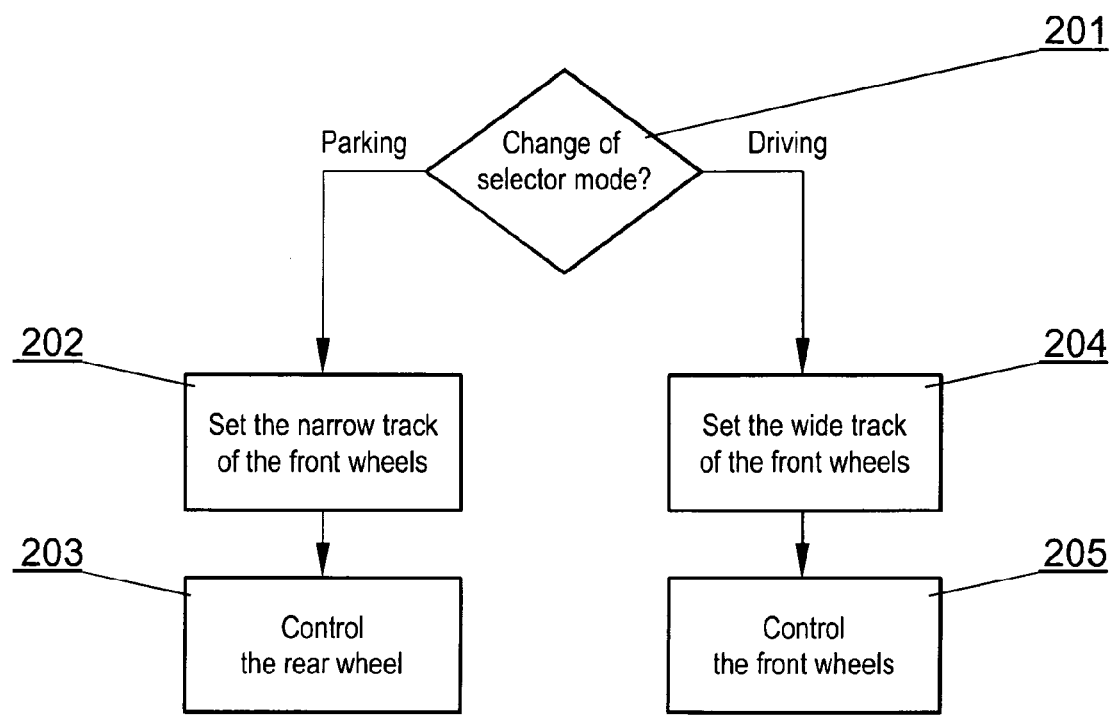
FIG. 18 shows a flow diagram of operation of the selector.

FIG. 18 shows a flow diagram of operation of the selector. The operation may be controlled mechanically or electrically by a central processing unit of the vehicle. When in step 201 a change of selector mode to the "parking mode" is detected, the track width control means are activated to in step 202 set the narrow track of the front wheels 111, 112 and next in step 203 the steering means are configured to control the turn of the rear wheel 121. In turn, when in step 201 a change of selector mode to the "driving mode" is detected, the track width control means are activated in step 204 to set the wide track of the front wheels 111, 112 and next in step 205 the steering means are configured to control the turn of the front wheels 111, 112 and/or of the rear wheel 121.

All the embodiments of the chassis of the vehicle as described above can be coupled with a tiltable frame, which comprises a tiltable portion 163, tiltable about a tilt axis 164, which lies within the longitudinal vertical plane of symmetry of the vehicle. and coupled with a drive rear axle with a rear wheel 121, and a non-tiltable portion 162 coupled with a front axle with a pair of front wheels 111, 112. FIGS. 19, 20 and 21 show a vehicle with a tiltable frame in a side view, in a front view and in a perspective view, respectively. The tiltable portion 163 is coupled with the non-tiltable portion 162 via a pivot joint 161. The longitudinal axis 164 is preferably inclined with respect to the driving surface by a certain degree. For example it may pass through the pivot joint 161 and the point of contact of the rear wheel 121 with the driving surface, which facilitates tilting of the body of the vehicle, the main portion 165 of which is coupled with the tiltable frame portion 163. Independently from the current width of the track of the front wheels 111, 112 and from the position of the tiltable frame portion 163, the front wheels 111, 112 are always perpendicular to the driving surface, which provides good traction and braking capabilities at all times.

When the front wheels 111, 112 are in a wide track, the vehicle is in a high speed driving mode. In such configuration the wide track of the front wheels provides good stability of the vehicle. In high speed driving mode, while driving in curves the tillable frame portion 163 is leaned towards the center of the curve and the subsequent displacement of the center of gravity of the whole vehicle towards the center of the curve counteracts all or a portion of the centrifugal lateral force and therefore helps to maintain lateral stability in turns.

In the high speed driving mode, directional steering of the vehicle can be effected either by tilting of the tiltable frame portion 163, or turning of the front wheels 111, 112, or a combination of both.

When the front wheels 111, 112 are in a narrow track, the vehicle is in a low speed parking mode, useful for low speed maneuvering and parking at tight parking spaces. In the low speed parking mode, the directional steering of the vehicle can be effected primarily by turning of the rear wheel, wherein the tilting of the tiltable frame portion 163 is at least limited or blocked.

The tilt is preferably controlled by a tilt actuator 166, which is controlled depending on the width of the track of the front wheels 111, 112. A self-tilting mechanism can be also employed, actuated by turn of the rear wheel 121, wherein the vehicle tilts due to the gyroscopic moment resulting from the turn of the rear wheel when driving at higher speeds.

The turn of the front wheels is optional, as the vehicle is able to turn by tilting and turn of the rear wheel only. Therefore, the front wheels may be configured to be turnable for example only for sharp turns or only for mild changes of direction.

The vehicle as described above may be operated in the following way. When the vehicle is to be driven at high speed, the front wheels may be set to the wide track, tilting means 166 cause tilting of the main body portion 165 together with the tiltable frame portion 163, and the vehicle can be optionally further controlled via the steering means configured to control the turn of the front wheels and/or of the rear wheel. Such "high speed driving mode" provides good stability for the vehicle. When the vehicle is to be driven at low speeds in narrow spaces or parked at a narrow space, the front wheels may be set to the narrow track and the vehicle can be controlled via the steering means configured to control the turn of the rear wheel, wherein the degree of tilt is limited or tilting possibility is blocked. Such "low speed parking mode" provides narrow dimensions of the vehicle and good maneuvering capabilities. Therefore, the vehicle can be easily parked in narrow parking spaces. When the wheel base shortens for a narrower front track width, the turning radius decreases and the maneuvering capabilities are further increased. When the wheel base increases for a wider front track width, the stability at high speeds increases.

The operation of both the track width control means and the steering means may be controlled by a common selector to be activated by the vehicle's driver. The selector may be set to the "low speed parking mode" or to the "high speed driving mode". The selector can be a dedicated switch on the vehicle dashboard. The selector may also be coupled with speed detector of the vehicle, allowing automatic transition between low speed parking mode and high speed driving mode depending on speed of the vehicle, according to a predefined algorithm and a set of parameters, such as vehicle's speed and current width of the vehicle's track. The algorithm followed by the selector can also take into account a set of other parameters such as vehicle's current weight, or lateral inclination of the surface on which the vehicle operates detected by appropriate sensors, such as to avoid turning the vehicle over as a result of selection an excessively narrow wheel track for given surface inclination.

The tilting mechanism is configured in such a way that in the high speed driving mode the position of the tiltable frame of the vehicle 163 is controlled by the actuator 166 according an algorithm taking into account primarily vehicle's speed and the radius of turn. The algorithm followed by the tilting mechanism can also take into account a set of other parameters such as vehicle's current weight, lateral inclination of the surface on which the vehicle moves, or quality of traction provided by that surface.

Figure 22:
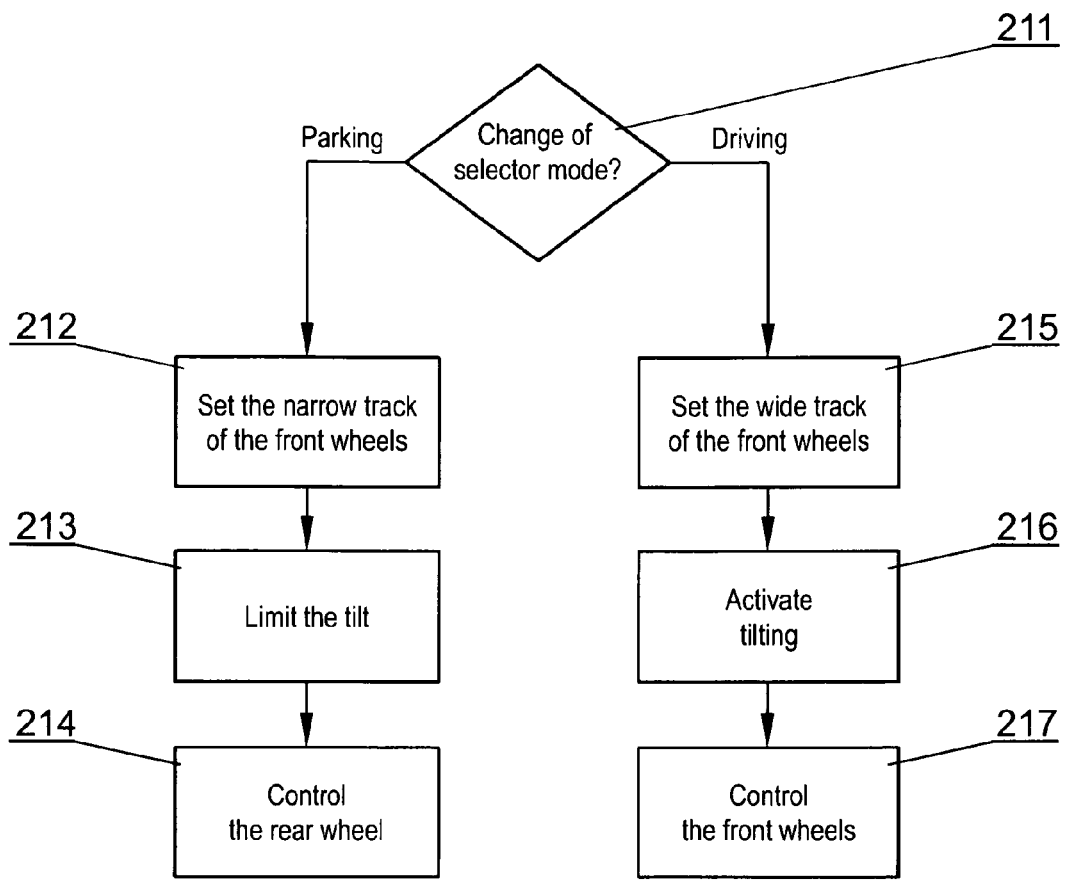
FIG. 22 shows a flow diagram of operation of the selector for a vehicle with a tiltable frame.

FIG. 22 shows a flow diagram of operation of the selector for a vehicle with a tiltable frame as shown in FIGS. 15-17. The operation may be controlled mechanically or electrically by a central processing unit of the vehicle. When in step 211 a change of selector mode to the "low speed parking mode" is detected, the track width control means are activated in step 212 to set the narrow track of the front wheels 111, 112 and next in step 213 the tilting means are configured to limit or block the tilt and in step 214 the steering means are configured to control the turn of the rear wheel 121. In turn, when in step 211 a change of selector mode to the "high speed driving mode" is detected, the track width control means are activated in step 215 to set the wide track of the front wheels 111, 112 and next in step 216 the tilting means are activated and optionally in step 217 the steering means are configured to control the turn of the front wheels 111, 112 and/or of the rear wheel 121.

In order to further improve vehicle's maneuverability in tight areas while providing the appropriate level of comfort to the driver, the body of the vehicle can have an elastic profile, as shown in FIGS. 23A and 23B, indicating the front view of the vehicle and a schematic view of the profile adjusting mechanism. For the high speed driving mode, the width passenger cabin of the increases, providing increased shoulder room, as shown in FIG. 23A, while in the low speed parking mode, the width of the cabin decreases to an allowable minimum, thus enabling operation in even narrower spaces, as shown in FIG. 23B.

In one embodiment of the vehicle, the body of the vehicle consists of an inner frame 301 and an outer shell 302. The outer shell consists of panels and windows made from elastic synthetic materials. The inner frame 301 includes a set of mechanical linkages 303 organized in a plane substantially perpendicular to the longitudal axis of the vehicle and a linear actuator 304. If the linear actuator 304 extracts, the linkages 303 push the side panels of the outer shell 302 outwards. The panels deform increasing the width of the cabin. Analogically, in order to decrease the width of the cabin, the linear actuator contracts, thereby pulling the side panels of the outer shell 302 inwards.

The embodiments presented above are exemplary embodiments of the invention. Various modifications can be made without departing from the scope of the invention, which is defined by the attached claims. For example, the rear axle may comprise more than one wheel, provided that the track width of the rear wheels is not wider than the narrow track of the front wheels. The vehicle may also comprise more than two axles.

The invention claimed is:

1. A vehicle comprising:
a front axle with a pair of front wheels (111, 112) having a track width adjustable between a wide track and a narrow track,
a drive rear axle with a rear wheel (121),
track width control means configured to change the track width of the front wheels (111, 112) and to change the wheel base between the front axle and the rear axle such that for the wide track of the front wheels (111, 112) the wheel base is longer than for the narrow track of the front wheels (111, 112),
characterized in that it further comprises:

steering means configured to control the turn of the rear wheel (121) when the front wheels (111, 112) are set to the narrow track, wherein the front wheels (111, 112) are non-turnable when the front wheels (111, 112) are set to the narrow track.

2. The vehicle according to claim 1, wherein the steering means are further configured to control the turn of the front wheels (111, 112) around a substantially vertical axis and of the rear wheel (121) around a substantially vertical axis depending on the track width of the front wheels (111, 112).

3. The vehicle according to claim 1, wherein the steering means are further configured to control the turn of the front wheels (111, 112) when the front wheels (111, 112) are set to the wide track.

4. The vehicle according to claim 3, wherein the rear wheel (121) is non-turnable when the front wheels (111, 112) are set to the wide track.

5. A vehicle comprising:
a front axle with a pair of front wheels (111, 112) having a track width adjustable between a wide track and a narrow track,
a drive rear axle with a rear wheel (121),
track width control means configured to change the track width of the front wheels (111, 112) and to change the wheel base between the front axle and the rear axle such that for the wide track of the front wheels (111, 112) the wheel base is longer than for the narrow track of the front wheels (111, 112),
characterized in that it further comprises:
steering means configured to control the turn of the rear wheel (121) when the front wheels (111, 112) are set to the narrow track, wherein the front wheels (111, 112) are non-turnable when the front wheels (111, 112) are set to the narrow track; and
the track width control means comprise pairs of wishbones (113, 114) connected to each of the front wheels (111, 112), each pair of wishbones (113, 114) connected pivotally at one point to a central frame (117) and at another point to one end of a push-pull rod (115, 116), the other end of which is pivotally connected with a piston (118) of a central linear actuator (119), such that the movement of the piston (118) causes change of the wheel base and the track width of the front wheels (111, 112).

6. The vehicle according to claim 1, wherein the track width control means are further configured to turn the front wheels (111, 112) towards the central axis of the vehicle when changing the track width of the vehicle from the wide track to the narrow track and to turn the front wheels (111, 112) away from the central axis of the vehicle when changing the track width of the vehicle from the narrow track to the wide track.

7. A vehicle comprising:
a front axle with a pair of front wheels (111, 112) having a track width adjustable between a wide track and a narrow track,
a drive rear axle with a rear wheel (121),
track width control means configured to change the track width of the front wheels (111, 112) and to change the wheel base between the front axle and the rear axle such that for the wide track of the front wheels (111, 112) the wheel base is longer than for the narrow track of the front wheels (111, 112),
characterized in that it further comprises:
steering means configured to control the turn of the rear wheel (121) when the front wheels (111, 112) are set to the narrow track, wherein the front wheels (111, 112) are non-turnable when the front wheels (111, 112) are set to the narrow track;

the track width control means are further configured to turn the front wheels (111, 112) towards the central axis of the vehicle when changing the track width of the vehicle from the wide track to the narrow track and to turn the front wheels (111, 112) away from the central axis of the vehicle when changing the track width of the vehicle from the narrow track to the wide track; and
the track width control means comprise variable-length steering rods (141, 142) connected to the front wheels (111, 112).

8. A vehicle comprising:
a front axle with a pair of front wheels (111, 112) having a track width adjustable between a wide track and a narrow track,
a drive rear axle with a rear wheel (121),
track width control means configured to change the track width of the front wheels (111, 112) and to change the wheel base between the front axle and the rear axle such that for the wide track of the front wheels (111, 112) the wheel base is longer than for the narrow track of the front wheels (111, 112),
characterized in that it further comprises:
steering means configured to control the turn of the rear wheel (121) when the front wheels (111, 112) are set to the narrow track, wherein the front wheels (111, 112) are non-turnable when the front wheels (111, 112) are set to the narrow track; and
the track width control means comprise pairs of wishbones (113, 114) connected to each of the front wheels (111, 112), each pair of wishbones (113, 114) connected to a retracting arm (143, 144) mounted pivotally at one point to a central frame (117) and at another point to one end of a push-pull rod (115, 116), the other end of which is pivotally connected with a piston (118) of a central linear actuator (119), such that the movement of the piston (118) causes change of the wheel base and the track width of the front wheels (111, 112).

9. A vehicle comprising:
a front axle with a pair of front wheels (111, 112) having a track width adjustable between a wide track and a narrow track,
a drive rear axle with a rear wheel (121),
track width control means configured to change the track width of the front wheels (111, 112) and to change the wheel base between the front axle and the rear axle such that for the wide track of the front wheels (111, 112) the wheel base is longer than for the narrow track of the front wheels (111, 112),
characterized in that it further comprises:
steering means configured to control the turn of the rear wheel (121) when the front wheels (111, 112) are set to the narrow track, wherein the front wheels (111, 112) are non-turnable when the front wheels (111, 112) are set to the narrow track; and
the track width control means comprise steering rods (145, 146) connected at one end to steering actuators (147, 148) and at another end to steering knuckle bearings (131, 132) of the front wheels (111, 112) to steer the turn of the front wheels (111, 112) around their individual vertical axes, wherein the steering actuators (147, 148) are connected to a central frame (117) and have a changeable length.

10. A vehicle comprising:
a front axle with a pair of front wheels (111, 112) having a track width adjustable between a wide track and a narrow track,
a drive rear axle with a rear wheel (121), track width control means configured to change the track width of the front wheels (111, 112) and to change the wheel base between the front axle and the rear axle such that for the wide track of the front wheels (111, 112) the wheel base is longer than for the narrow track of the front wheels (111, 112), characterized in that it further comprises:

steering means configured to control the turn of the rear wheel (121) when the front wheels (111, 112) are set to the narrow track, wherein the front wheels (111, 112) are non-turnable when the front wheels (111, 112) are set to the narrow track; and the track width control means comprise pairs of upper and lower front suspension arms (171, 173) connected pivotally at one end to a driving arm (175) and at another end pivotally to a pair of upper and lower rear suspension arms (172, 174) connected pivotally at one end to a central frame (117) and at another end to a steering knuckle bearing of the front wheel (111, 112), the driving arm (175) being pivotally mounted to the central frame (117) and turnable around a substantially vertical axis at the point of connection to the central frame (117) in order to control the track width of the front wheels and the wheel base of the vehicle.

11. The vehicle according to claim 10, further comprising a toe control mechanism comprising positioning arms (193), to which steering rods (191) are mounted for controlling the toe of the front wheels (111, 112).

12. The vehicle according to claim 11, wherein the toe control mechanism is mounted on a base (190) pivotally connected to a vehicle frame via a bearing (196) to allow steering the turn of the front wheels (111, 112) via the steering rods (191) by turning the base (190).

13. The vehicle according to claim 1, wherein the front wheels (111, 112) are turnable around individual axes (131, 132).

14. The vehicle according to claim 1, wherein the front wheels (111, 112) are turnable around a common axis (151).

15. A vehicle comprising:

a front axle with a pair of front wheels (111, 112) having a track width adjustable between a wide track and a narrow track, a drive rear axle with a rear wheel (121), track width control means configured to change the track width of the front wheels (111, 112) and to change the wheel base between the front axle and the rear axle such that for the wide track of the front wheels (111, 112) the wheel base is longer than for the narrow track of the front wheels (111, 112), characterized in that it further comprises:

steering means configured to control the turn of the rear wheel (121) when the front wheels (111, 112) are set to the narrow track, wherein the front wheels (111, 112) are non-turnable when the front wheels (111, 112) are set to the narrow track;

the front wheels (111, 112) are turnable around a common axis (151); and the front axle is turnable by a linear actuator (152).

16. A vehicle comprising:

a front axle with a pair of front wheels (111, 112) having a track width adjustable between a wide track and a narrow track, a drive rear axle with a rear wheel (121), track width control means configured to change the track width of the front wheels (111, 112) and to change the wheel base between the front axle and the rear axle such that for the wide track of the front wheels (111, 112) the wheel base is longer than for the narrow track of the front wheels (111, 112), characterized in that it further comprises:

steering means configured to control the turn of the rear wheel (121) when the front wheels (111, 112) are set to the narrow track, wherein the front wheels (111, 112) are non-turnable when the front wheels (111, 112) are set to the narrow track; and the rear wheel (121) is turnable around an axis (123) offset from the center of the rear wheel (121) by a distance larger than the radius of the rear wheel (121).

17. A vehicle comprising:

a front axle with a pair of front wheels (111, 112) having a track width adjustable between a wide track and a narrow track, a drive rear axle with a rear wheel (121), track width control means configured to change the track width of the front wheels (111, 112) and to change the wheel base between the front axle and the rear axle such that for the wide track of the front wheels (111, 112) the wheel base is longer than for the narrow track of the front wheels (111, 112), characterized in that it further comprises:

steering means configured to control the turn of the rear wheel (121) when the front wheels (111, 112) are set to the narrow track, wherein the front wheels (111, 112) are non-turnable when the front wheels (111, 112) are set to the narrow track; and the rear axle is turnable by a linear actuator (124).

18. A vehicle comprising:

a front axle with a pair of front wheels (111, 112) having a track width adjustable between a wide track and a narrow track, a drive rear axle with a rear wheel (121), track width control means configured to change the track width of the front wheels (111, 112) and to change the wheel base between the front axle and the rear axle such that for the wide track of the front wheels (111, 112) the wheel base is longer than for the narrow track of the front wheels (111, 112), characterized in that it further comprises:

steering means configured to control the turn of the rear wheel (121) when the front wheels (111, 112) are set to the narrow track, wherein the front wheels (111, 112) are non-turnable when the front wheels (111, 112) are set to the narrow track; and a selector configured to control the operation of both the track width control means and the steering means.

19. The vehicle according to claim 18, wherein the selector is coupled with a gear lever.

20. A vehicle comprising:

a front axle with a pair of front wheels (111, 112) having a track width adjustable between a wide track and a narrow track, a drive rear axle with a rear wheel (121), track width control means configured to change the track width of the front wheels (111, 112) and to change the wheel base between the front axle and the rear axle such that for the wide track of the front wheels (111, 112) the wheel base is longer than for the narrow track of the front wheels (111, 112), characterized in that it further comprises:

steering means configured to control the turn of the rear wheel (121) when the front wheels (111, 112) are set to the narrow track, wherein the front wheels (111, 112) are non-turnable when the front wheels (111, 112) are set to the narrow track;
a frame comprising:
  a tiltable portion (163) tiltable about a tilt axis (164) and coupled with a drive rear axle with a rear wheel (121),
  a non-tiltable portion (162) coupled with a front axle with a pair of front wheels (111, 112);
a main body portion (165) coupled with the tiltable frame portion (163); and
tilting means (166) for tilting the tiltable frame portion (163) when the front wheels (111, 112) are set to the wide track.

21. The vehicle according to claim 20, wherein the tilt axis (164) lies within the longitudinal vertical plane of symmetry of the vehicle.

22. The vehicle according to claim 20, wherein the tilting means (166) are configured to tilt the tiltable frame portion (163) when the front wheels (111, 112) are in the narrow track to a smaller extent than when the front wheels (111, 112) are in the wide track.

23. The vehicle according to claim 20, wherein the tilting means (166) are configured to block the tilt of the tiltable frame portion (163) when the front wheels (111, 112) are in the narrow track.

24. The vehicle according claim 20, wherein the tilting means (166) comprise a tilt actuator (166).

25. The vehicle according to claim 20, wherein the tilting means (166) comprise a self-tilting mechanism actuated by turn of the rear wheel (121).

26. The vehicle according to claim 20, wherein the longitudinal tilt axis (164) is inclined with respect to a road surface.

27. A vehicle comprising:
a front axle with a pair of front wheels (111, 112) having a track width adjustable between a wide track and a narrow track,
a drive rear axle with a rear wheel (121),
track width control means configured to change the track width of the front wheels (111, 112) and to change the wheel base between the front axle and the rear axle such that for the wide track of the front wheels (111, 112) the wheel base is longer than for the narrow track of the front wheels (111, 112),
characterized in that it further comprises:
steering means configured to control the turn of the rear wheel (121) when the front wheels (111, 112) are set to the narrow track, wherein the front wheels (111, 112) are non-turnable when the front wheels (111, 112) are set to the narrow track; and
an elastic outer shell (302) forming a cabin of the vehicle and having a width controlled by a linear actuator (304) coupled with linkages (303) such that the width of the cabin is higher for the wide track of the front wheels than for the narrow track of the front wheels.

* * * * *